US007831764B2

(12) United States Patent
Nakajima et al.

(10) Patent No.: US 7,831,764 B2
(45) Date of Patent: Nov. 9, 2010

(54) STORAGE SYSTEM HAVING PLURAL FLASH MEMORY DRIVES AND METHOD FOR CONTROLLING DATA STORAGE

(75) Inventors: Akio Nakajima, Yokohama (JP); Kentaro Shimada, Tokyo (JP); Shuji Nakamura, Machida (JP); Nagamasa Mizushima, Machida (JP)

(73) Assignee: Hitachi, Ltd, Tokyo (JP)

( * ) Notice: Subject to any disclaimer, the term of this patent is extended or adjusted under 35 U.S.C. 154(b) by 515 days.

(21) Appl. No.: 12/007,329

(22) Filed: Jan. 9, 2008

(65) Prior Publication Data

US 2008/0201392 A1   Aug. 21, 2008

(30) Foreign Application Priority Data

Feb. 19, 2007 (JP) ............................. 2007-037623

(51) Int. Cl.
G06F 13/10 (2006.01)
(52) U.S. Cl. ................. 711/103; 711/153; 711/E12.019
(58) Field of Classification Search ................. 711/103, 711/153
See application file for complete search history.

(56) References Cited

U.S. PATENT DOCUMENTS

| | | | |
|---|---|---|---|
| 5,524,230 A | 6/1996 | Sakaue et al. | |
| 2001/0048121 A1 | 12/2001 | Mizushima et al. | |
| 2003/0084237 A1 | 5/2003 | Yoshida et al. | |
| 2004/0221105 A1 | 11/2004 | Fujimoto et al. | |
| 2005/0021906 A1 | 1/2005 | Nakamura et al. | |
| 2005/0177681 A1 | 8/2005 | Fujimoto et al. | |
| 2005/0235081 A1 | 10/2005 | Fujimoto et al. | |
| 2006/0048018 A1 | 3/2006 | Hosoya et al. | |
| 2006/0085570 A1 | 4/2006 | Hosoya et al. | |
| 2006/0200696 A1 | 9/2006 | Shimada | |
| 2008/0022163 A1* | 1/2008 | Tanaka et al. | ................ 714/710 |

FOREIGN PATENT DOCUMENTS

JP   05-027924   7/1991

(Continued)

OTHER PUBLICATIONS

David A. Patterson et al., A Case for Redundant Arrays of Inexpensive Disks (RAID), 1988 ACM, pp. 109-116.

*Primary Examiner*—Reginald G Bragdon
*Assistant Examiner*—Kenneth M Lo
(74) *Attorney, Agent, or Firm*—Foley & Lardner LLP

(57) ABSTRACT

Provided is a storage system having a storage device including memory drives formed of the non-volatile memory, a group is constituted by the memory drives whose number is larger than the number of memory drives necessary to provide the memory capacity, the divided storage areas are managed in each of segments that includes at least one of the divided storage areas, the data storage area or the temporary storage area is allocated to the divided storage areas, upon receiving a data write request, the data storage area in which the write data is written and the segment are specified, the updated data is written in the temporary storage area included in the specified segment, the temporary storage area in which the data is written is set as a new data storage area, and data stored in the data storage area is erased and set as a new temporary storage area.

20 Claims, 13 Drawing Sheets

FOREIGN PATENT DOCUMENTS

| | | |
|---|---|---|
| JP | 11-126488 | 10/1997 |
| JP | 2001-051904 | 8/1999 |
| JP | 2001-350665 | 6/2000 |
| JP | 2003-140837 | 10/2001 |
| JP | 2005-043930 | 7/2003 |
| JP | 2004-240949 | 11/2003 |
| JP | 2005-227807 | 2/2004 |
| JP | 2005-228245 | 2/2004 |
| JP | 2005-301802 | 4/2004 |
| JP | 2006-072717 | 9/2004 |
| JP | 2006-243967 | 3/2005 |
| WO | WO 01/13214 A1 | 8/2000 |

* cited by examiner

EXCEEDING THRESHOLD VALUE OF FMD#A4                                      900

| Segment # | \multicolumn{6}{c}{DATA ARRANGEMENT OF RESPECTIVE FMD RELATED TO RAID GROUP A} | |
|---|---|---|---|---|---|---|
| | 0 | 1 | 2 | 3 | 4 | 5 |
| | FMD A1 | FMD A2 | FMD A3 | FMD A4 | FMD A5 | FMD A6 |
| 1 | Parity (1,2) | D(1) | D(2) | Temp | Temp | Temp |
| 2 | Temp | D(3) | Temp | Temp | D(4) | Parity (3,4) |
| ... | ... | ... | ... | ... | ... | ... |
| N | Temp | D(n-1) | D(n) | Parity (n-1,n) | Temp | Temp |

LBA ↓

DEFECTIVE DRIVE

FIG. 10A

COLLECTION COPY                                      950

| Segment # | \multicolumn{6}{c}{DATA ARRANGEMENT OF RESPECTIVE FMD RELATED TO RAID GROUP A} | |
|---|---|---|---|---|---|---|
| | 0 | 1 | 2 | 3 | 4 | 5 |
| | FMD A1 | FMD A2 | FMD A3 | FMD A4 | FMD A5 | FMD A6 |
| 1 | Parity (1,2) | D(1) | D(2) | Temp | Temp | Temp |
| 2 | Temp | D(3) | Temp | Temp | D(4) | Parity (3,4) |
| ... | ... | ... | ... | ... | ... | ... |
| N | Temp | D(n-1) | D(n) | Parity (n-1,n) | NEW Parity (n-1,n) | Temp |

STORAGE SYSTEM HAVING PLURAL FLASH MEMORY DRIVES AND METHOD FOR CONTROLLING DATA STORAGE

CLAIM OF PRIORITY

The present application claims priority from Japanese patent application JP 2007-037623 filed on Feb. 19, 2007, the content of which is hereby incorporated by reference into this application.

BACKGROUND

This invention relates to a storage system having a redundant configuration and uses a semiconductor memory such as a flash memory, and more particularly, to a technique of improving processing performance and reliability.

In recent years, a non-volatile memory representative of a flash memory has been gaining attention. The flash memory is low power consumption as compared with a magnetic storage system, and therefore is suitably reduced in size and weight. For that reason, the flash memory is an external storage system that can be substituted for the magnetic disk drive.

The flash memory is characterized in that idle power consumption is low as compared with a dynamic random access memory (DRAM). This is because the DRAM requires periodic refresh operations necessary for memory holding. Also, the flash memory is low in power consumption because the flash memory has no actuator of the magnetic storage system such as a hard disk drive (HDD).

The flash memory is low in costs as compared with a static random access memory (SRAM) that is generally used as a main memory of a computer device. The SRAM does not require the refresh operation of the DRAM. However, the circuit is complicated as compared with the DRAM and the flash memory, whereby it is difficult to enhance the degree of integration.

The flash memory is small in size as compared with the magnetic storage system, and has the characteristic of the low power consumption as described above. Therefore, the flash memory is advantageous in that high-density mounting can be achieved as a main memory of a storage system.

Accordingly, it is expected that a flash memory drive having a plurality of flash memories is substituted functioning as the high-capacity main memory for the magnetic storage system functioning as the high-capacity main memory.

However, the flash memory has problems different from those of the SRAM, the DRAM, and the magnetic storage system. More specifically, the flash memory requires the erasing operation before data is overwritten. In the flash memory, conducting the erasing operation requires long time. As a result, the through-put performance at the time of overwriting the data recorded in the flash memory is inferior to that at the time of reading the data.

Also, the erasing operation before the data is overwritten cannot be performed by a block unit that is the minimum unit of reading and writing. The flash memory conducts the erasing operation by a page unit having a plurality of blocks described above.

In addition, the number of times of erasing data stored in the flash memory is limited to about $10^5$ to $10^6$ times. In this way, since the number of times of rewriting in the flash memory is limited, the number of times of erasing operation in the flash memory is made uniform in each of the areas to prevent the rewriting operation from concentrating on one area, to thereby extend the lifetime (refer to JP H05-27924 A and JP 3534585 B).

As described above, because the flash memory stores a plurality of blocks each of which is a unit of reading/writing in a page being a unit of erasing, the access units of the operation of erasing or reading/writing the data are different from each other. For that reason, in the flash memory, in the case where data is overwritten at the same address, it is necessary to write the data in a block having a different address which has been erased. Hence, a logical block address (LBA) in the reading and writing operation and a physical block address (PBA) that is managed in the interior of the flash memory drive are not always same order.

Accordingly, when the small-sized random overwriting operation is repeated, a fragment occurs. Then, when the above-mentioned operation is implemented, there can be created a page in which a block that waits for erasing and cannot be overwritten, and a readable block are mixed together. In order to erase the page including the erasing waiting block and the readable block, it is necessary to migrate the readable data to another area. In the case where the erasing operation is not conducted, an area of the data to be rewritten next depletes.

Thus, in order to ensure the write area, the flash memory migrates a block in use to another writable block from the page having the erasing waiting block and the readable block mixed together to conduct the operation for making the page erasing executable. The series of operation is generally called "reclamation".

There is an external storage system (memory drive) having a plurality of non-volatile memories as the substitute of the magnetic storage system such as the HDD. In particular, the external storage system having flash memories being the non-volatile memories is called "flash memory drive (FMD)" hereinafter. Also, the control of the storage system using the plurality of flash memory drives is applied with a technique to be described below as in the conventional control method for the storage system having the plurality of magnetic storage systems, to thereby enhance the reliability of the storage system.

Further, the storage system of one kind is required in the robustness and has double configurational elements, to thereby enable the processing even in the case where a failure occurs in the configurational elements. In addition, in order to enhance the reliability of data and the processing performance, the plurality of storage systems are managed as one RAID (Redundant Array of Independence Disks) group through the RAID technique, and the data is made redundant and stored. The RAID group forms one or more logical storage areas. When data is stored in the storage area, the redundant data is stored in the storage system that constitutes the RAID group. Even in the case where one of the storage systems fails due to the redundant data, it is possible to restore the data. The RAID configuration is categorized plural levels which have different redundancy. Hereinafter, RAID 1, RAID 4 and RAID 5 will be described as typical RAID configuration.

According to RAID 1 configuration, all of data that has been stored in the drive is copied onto another drive. The capacitive efficiency total capacity being possible to use of the RAID 1 configuration is a half of the total capacity of physical capacity of disk drive.

RAID 4 configuration and RAID 5 configuration store an error correct code (ECC) that is calculated by a plurality of pieces of data in an ECC drive, and are capable of restoring the data that has been stored in the failed drive by the aid of the remaining data and the ECC even if a failure occurs in one of the drives.

However, according to the RAID 4 configuration, it is required to update the ECC data every time the data is written, and writing into the drive that only stores the ECC data induces the bottleneck of the write performance of the entire RAID group.

According to the RAID 4 configuration, redundant data (ECC) is always stored into the same drive (parity drive), on the other hand, according to the RAID 5 configuration, redundant data is stored into each drive included in RAID group (data drives and parity drive are not separated). Therefore, the RAID 5 configuration can rise up writing performance than the RAID 4 configuration, because redundant data is dispersedly stored into plural drives included in RAID group when data is written in the RAID 5 configuration. The capacitive efficiency is determined according to the ratio of the number of data drives to the number of parity drives.

The storage system that constitutes the RAID is incapable of restoring the data when a failure occurs in a given number of drives or more. Under the circumstances, the storage system provides a so-called "spare drive" that does not save data.

Then, in the case where a failure occurs in one of the drives that constitute the RAID, the storage system restores the data of the drive that has failed and stores the data in the spare drive by the aid of the data of the remaining drives that constitute the RAID. In this way, the spare drive is prepared in advance, thereby enabling to restore a degenerate state to a redundant state quickly. The above-mentioned operation in which data stored in the failed drive is restored and stored in a normal drive is called "collection copy" hereinafter.

SUMMARY

The storage system in which the RAID configuration is applied to the flash memory drive has several subjects due to the drawbacks specific to the flash memory drives such as the limitation of the number of times of erasing operation described above.

As a first subject, in the case where the storage system sequentially writes data having a size larger than a page size in the flash memory drive, there is the possibility that the pages from which data has been erased deplete. In this case, the write performance is deteriorated due to the bottleneck of the erasing time.

As a second subject, when the RAID technique of the conventional data reliability technique applied to the magnetic storage system is applied to the storage system in which the RAID configuration is applied to the plurality of flash memory drives, the overwrite update of the parity frequently occurs. For that reason, when the overwrite operation is consecutively executed with respect to the flash memory, the performance of the entire system is deteriorated due to a time accompanied by the reclamation and erasing in the interior of the flash memory drive.

As a third subject, in the storage system in which the RAID5 configuration is applied to the group of the plurality of flash memory drives, it is difficult to make the number of times of writing uniform in the respective flash memory drives. The storage system in which the RAID5 configuration is applied to the flash memory drive, even if a part of data is rewritten, the parity is successively updated. Accordingly, the number of times of writing in the areas where the parity has been stored is larger than the areas where the data has been stored.

As a fourth subject, in the case where a failure occurs in one drive, the storage system of the RAID configuration executes the above-mentioned collection copy in order to ensure the redundancy of data. At the time of executing the collection copy, all of data that has been stored in the plurality of drives except the failed drive is read, and the data that has been stored in the failed drive is restored by the data restoring operation such as an exclusive OR (XOR). However, an increase in the amount of data leads to an increase in transfer traffic of data with the result that an enormous calculation time is required for the data restoring operation. For that reason, this drawback affects the input/output performance from a normal host computer during the execution of the collection copy, and the performance of the overall storage system is deteriorated.

An object of this invention is to solve the above-mentioned subjects in a storage system including a memory drive that is configured by a non-volatile memory having the above-mentioned properties of the flash memory.

A representative aspect of this invention is as follows. That is, there is provided a storage system, which is coupled to a host computer through a network and stores data that is read/written by the host computer, comprising: an interface that is coupled to the network; a processor that is coupled to the interface; a memory that is coupled to the processor; a cache memory in which the read/written data is temporarily stored; and a storage device in which the read/written data is stored, wherein the storage device comprises at least one memory drive that is formed of non-volatile memory, and forms a group of the memory drives whose number is larger than the number of memory drives necessary to provide the memory capacity which is identified by the host computer, wherein each of the memory drives included in the group has a storage area divided in predetermined capacity, wherein the divided storage areas are managed in each of segments that includes at least one of the divided storage areas included in the respective memory drives included in the group, wherein the processor allocates, to the respective divided storage areas, at least one data storage area in which the read and written data is stored and at least one temporary storage area which is a free area are included in the segment, wherein in the case where the processor receives a write request from the host computer through the interface, the processor extracts the data storage area in which the write data is written, and specifies the segment including the extracted data storage area, and wherein in the case where size of the write data is larger than a value that is determined on the basis of size of the data that is stored in the extracted data storage area, the processor reads the data stored in the extracted data storage area, updates the read data according to the write request, stores the updated data in the cache memory, selects first temporary storage area included in the specified segment, writes the data stored in the cache memory in the selected first temporary storage area, sets the selected first temporary storage area as a new data storage area, erases the extracted data storage area, and sets the area as a new temporary storage area.

According to a representative embodiment of this invention, it is possible to make the number of times of writing uniform in the respective memory drives while migrating a data storage area in which data is read or written in a storage system in which a storage device is configured by a memory drive. Accordingly, in the storage system according to this invention, it is possible to make the lifetimes of the respective memory drives uniform. Also, an erasing time that induces the bottleneck from the viewpoint of performance is depleted, thereby enabling the performance of the storage system to improve.

BRIEF DESCRIPTION OF THE DRAWINGS

The present invention can be appreciated by the description which follows in conjunction with the following figures, wherein:

FIG. 10A is a diagram showing a data arrangement at the time when the total of defective pages has exceeded the threshold value before the collection copy is executed according to the embodiment of this invention;

FIG. 10B is a diagram showing a data arrangement after the data of the defective drive has been copied to a segment corresponding to another flash memory drive according to the embodiment of this invention.

DETAILED DESCRIPTION OF THE PREFERRED EMBODIMENT

Hereinafter, an embodiment of this invention will be described with reference to the accompanying drawings.

(Configuration of Storage System)

Figure 1A:
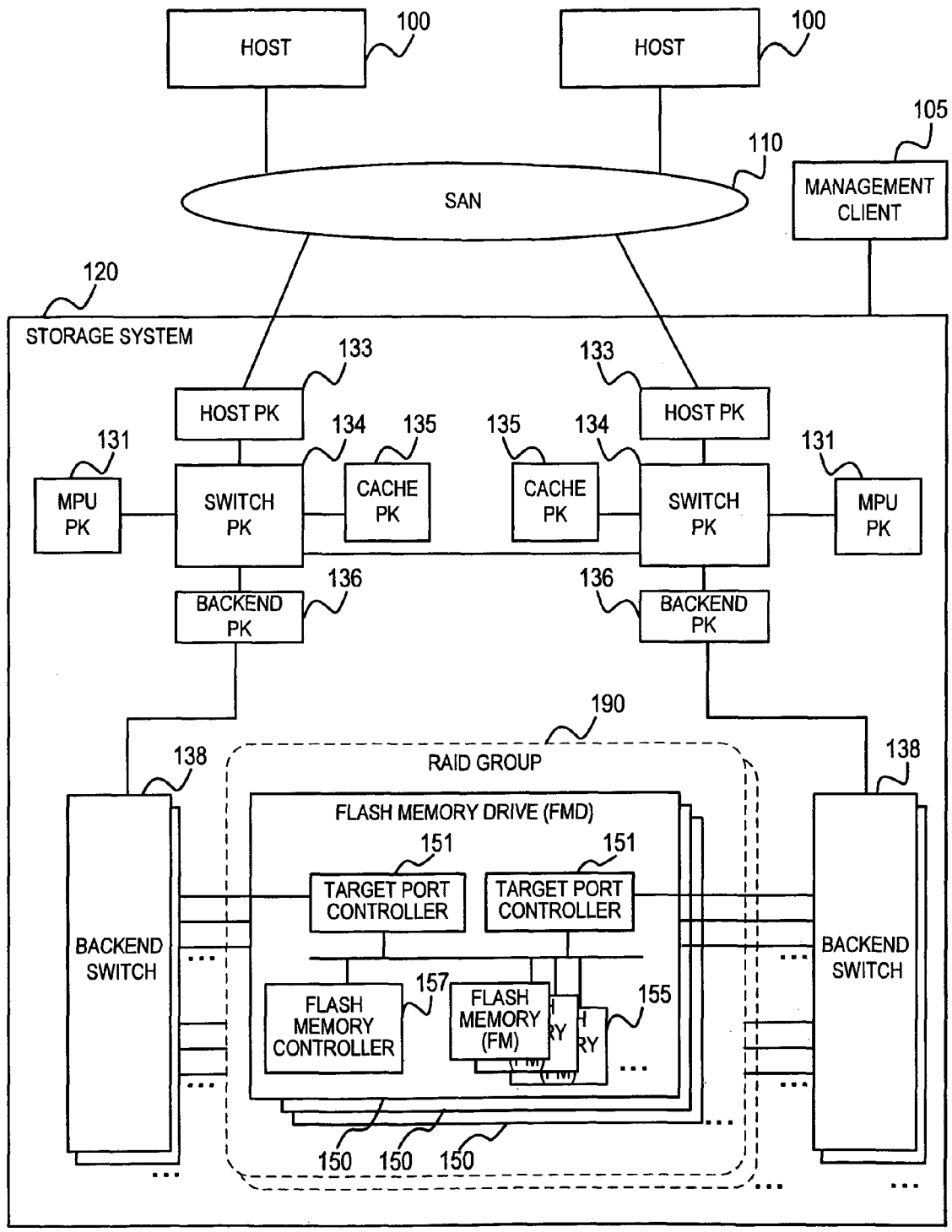
FIG. 1A is a configuration diagram showing a computer system mainly including a storage system according to an embodiment of this invention.

FIG. 1A is a configuration diagram showing a computer system mainly including a storage system 120 according to an embodiment of this invention. The computer system includes host computer 100, a management client 105, and a storage system 120.

Each of the host computers 100 is connected to the storage system 120 via a storage area network (SAN) 110. The management client 105 is connected to the storage system 120 to control the preparation of an RAID group.

The storage system 120 comprises at least one host package (HOST PK) 133, at least one processor package (MPU PK) 131, at least one cache package (CACHE PK) 135, at least one backend package (BACKEND PK) 136, and flash memory drives (FMD) 150. The host PK 133, the MPU PK 131, the cache PK 135, and the backend PK 136 are connected to a switch PK 134, respectively.

The storage system 120 is of a redundant configuration having two sets of the host PKs 133, the MPU PKs 131, the cache PKs 135, the backend PKs 136, and the switch PKs 134. For that reason, even in the case where one of those packages fails, the storage system 120 is capable of continuing the service by another package. The outline of the respective configurations will be described below.

The host PK 133 includes an interface (I/F) controller such as fiber channel or iSCSI as a host interface. The storage system 120 is routed through the host PK 133, and connected to the plurality of host computers 100 through the SAN 110.

Each of the MPU PKs 131 controls the storage system 120. The configuration of the MPU PK 131 will be described in detail with reference to FIG. 1B.

Each of the cache PKs 135 includes a cache memory and a cache controller. The cache memory is a primary storage area of user data that is stored in the storage system 120. The cache controller connects the cache memory and the switch PK 134.

Each of the backend PKs 136 includes an interface controller that controls a plurality of storage devices within the storage system. The interface controller is connected to the plurality of storage devices (for example, HDDs and flash memory drives) through each of backend switches 138.

Now, each of the flash memory drives 150 will be described. The flash memory drive 150 is a storage device that is made up of two target port controllers 151, a flash memory controller 157, and at least one flash memory (FM) 155.

Each of the target port controllers 151 is connected to the backend switch 138. The flash memory controller 157 controls each of the flash memory drives 150. Each of the flash memories (FM) 155 stores data therein.

Because the target port controller 151 is made redundant, even in the case where a failure occurs in each of the packages or the backend switches, the flash memory drive 150 is routed through the redundant target port, and is capable of accessing to the FMD.

The storage system 120 constitutes an RAID group 190 by the plurality of flash memory drives 150 in order to make the data redundant. However, the RAID group 190 is different from the configuration in which the arrangement of the parity is fixed as that in the general RAID5. The arrangement of the parity will be described in detail with reference to FIG. 2.

(Details of MPU Package)

Figure 1B:
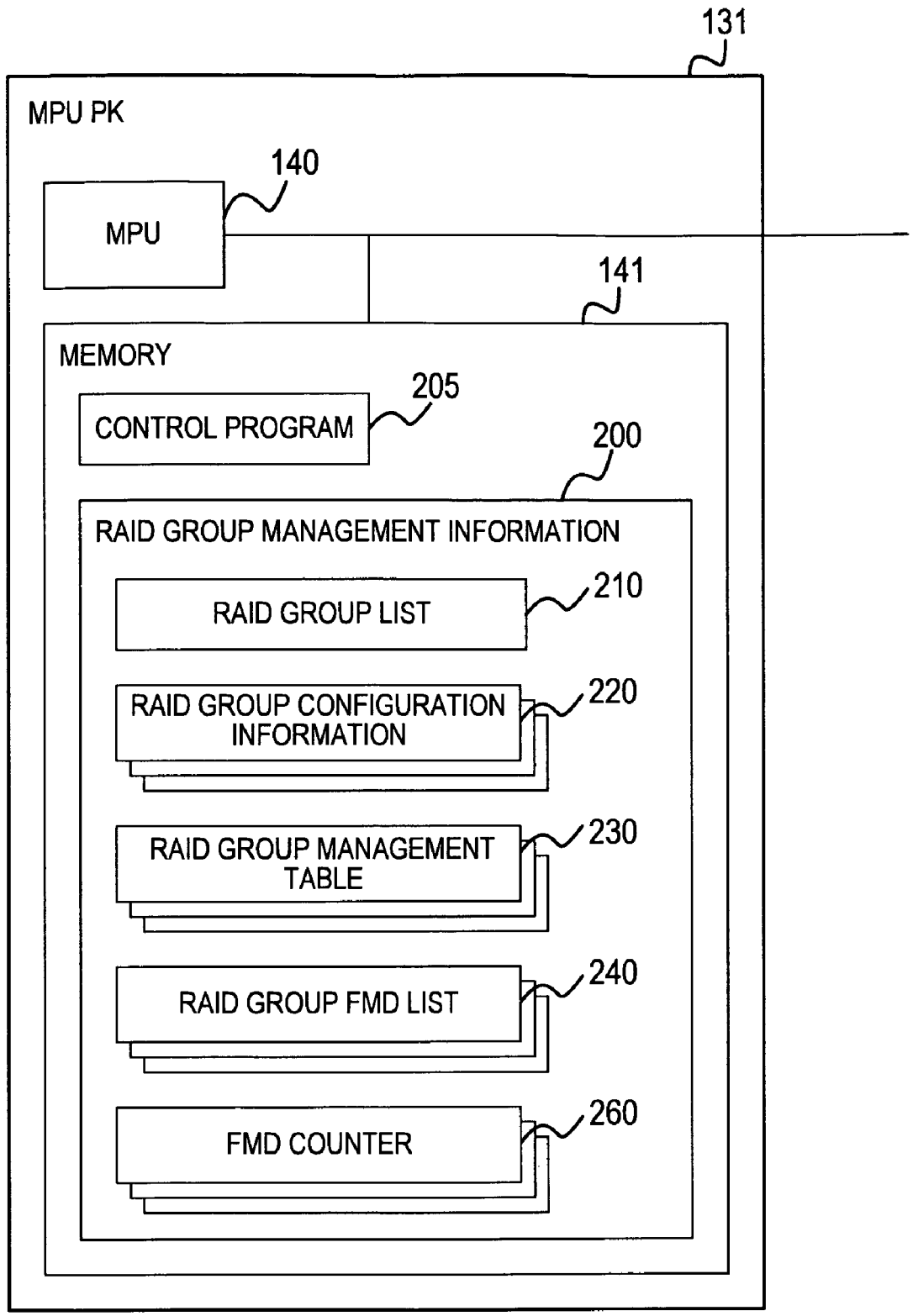
FIG. 1B is a configuration diagram showing a MPU package according to an embodiment of this invention.

FIG. 1B is a configuration diagram showing the MPU PK 131 of the storage system 120 according to the embodiment of this invention. The MPU PK 131 includes an MPU 140 and a memory 141.

The MPU 140 executes control program 205 stored in the memory 141, to thereby control the storage system 120. The memory 141 further stores RAID group management information 200 that manages the RAID group 190 disposed in the storage system 120. Also, the MPU PK 131 includes a bridge that connects the MPU 140 to the switch PK 134.

The RAID group management information 200 includes an RAID group list 210, RAID group configuration information 220, an RAID group management table 230, an FMD number list 240, and an FMD counter 260. The above-mentioned configuration information will be described in detail with reference to FIG. 2.

(Configuration of RAID Group)

Now, the configuration of the RAID group 190 will be described in detail with reference to FIG. 2 and FIG. 3.

Figure 2:
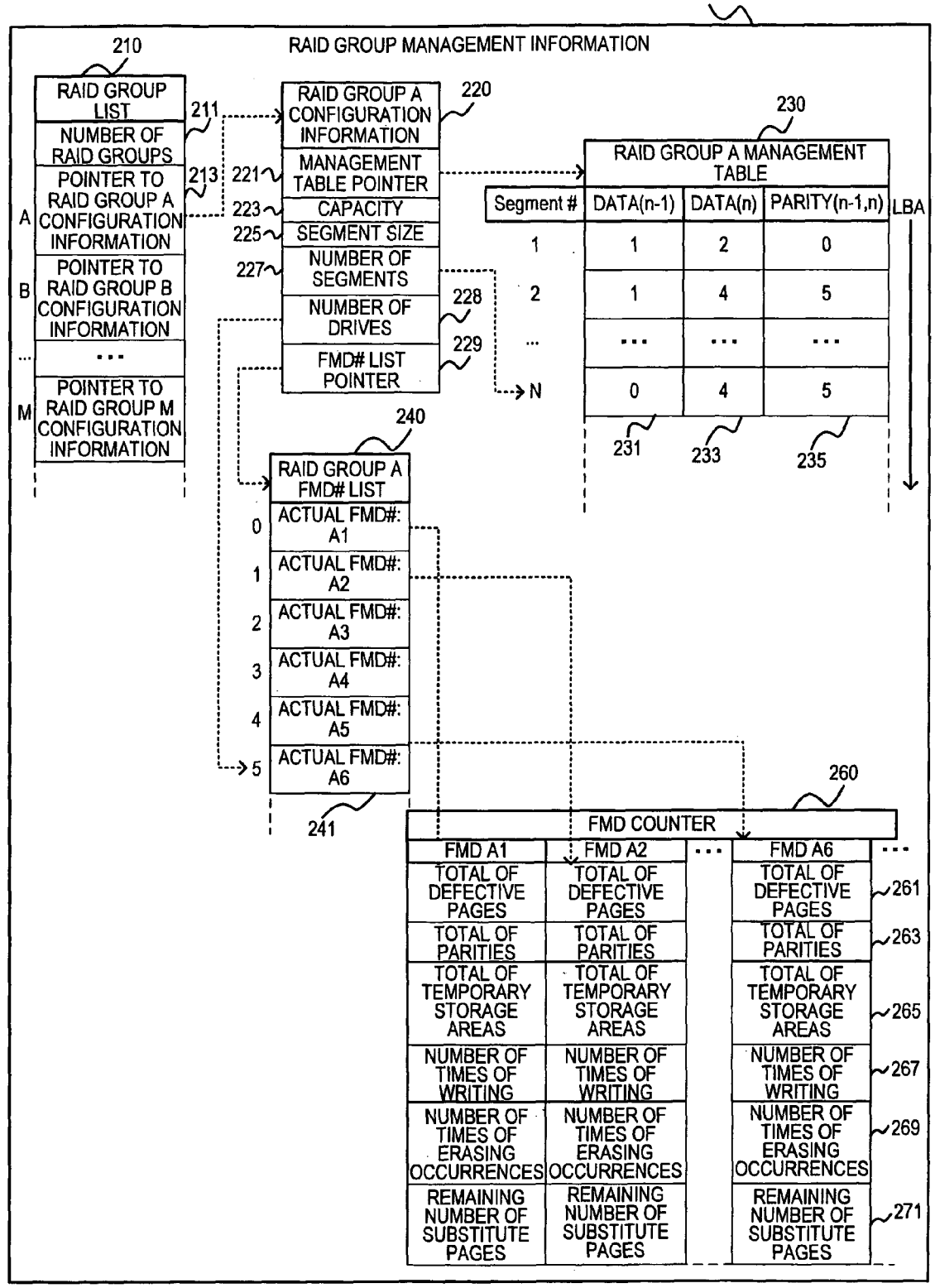
FIG. 2 is a diagram showing the RAID group management information according to the embodiment of this invention.

FIG. 2 is a diagram showing the RAID group management information 200 according to the embodiment of this invention. As described above, the RAID group management information 200 includes the RAID group list 210, the RAID group configuration information 220, the RAID group management table 230, the FMD number list 240, and the FMD counter 260. Hereinafter, the respective information will be described in detail.

The RAID group list 210 stores a total 211 of a plurality of RAID groups which are defined in the storage system 120. Also, the RAID group list 210 holds a pointer 213 to the configuration information 220 of the respective RAID groups 190 by the number as large as the number of RAID groups 190.

The respective configuration information of an RAID group A will be described below. The same configuration is applied to other RAID groups.

The configuration information 220 of the RAID group A includes a pointer 221 to the RAID group management table 230, a capacity 223, a segment size 225, a number of segments 227, a number of flash memory drives 228, and a pointer 229 to the FMD number list 240.

The pointer 221 of the RAID group management table 230 stores an address at which the RAID group management table 230 of the RAID group A is stored.

The RAID group A is made up of a plurality of flash memory drives 150, and provides a storage area in which data is stored. The capacity 223 stores the capacity of the storage area that is provided by the RAID group A.

Also, the flash memory drive 150 that constitutes the RAID group A is divided in each of given capacities as segments that are management units. The segment size 225 stores the capacities of the respective divided segments. In this embodiment, the segment size 225 is, for example, 128 kilobytes. The number of segments 227 stores the number of segments included in the RAID group A.

Also, the capacity of segments in each of the flash memory drives is larger than the capacity of the block that is an access unit to the flash memory, and equal to or smaller than the capacity of the page that is an erasing unit.

In this embodiment, for example, the capacity of the block is 512 bytes. Also, it is possible that 520 bytes resulting from adding 8 bytes of an assurance code that is calculated by the control program to the data block can be used as the capacity of the block of the flash memory. Also, the page is the erasing unit of the flash memory, and in the case where the erasing operation cannot be performed, the page is a unit of defective page. In this embodiment, the capacity of the page is, for example, 128 kilobytes. In this embodiment, the capacity of the segment and the capacity of the page are set to the same value so far as not particularly described.

The number of flash memory drives 228 stores the number of a plurality of flash memory drives that constitute the RAID group A. The pointer 229 to the FMD number list 240 stores the address of the FMD number list 240.

The RAID group management table 230 stores the flash memory drive number that stores the data and parity. The RAID group management table 230 compresses the bit map information, or limits the pattern of the arrangement of data or parity, thereby enabling the amount of information to be reduced. Also, the segment Nos. that identify the segments are allocated to the respective entries of the RAID group management table 230 in an order of the logical block address (LBA).

In this embodiment, the RAID configuration of the RAID group A is RAID5, which is a configuration including two data and one parity (hereinafter referred to as "2D1P configuration") which creates one parity (ECC) from two data storage areas.

The FMD number list 240 is a list of the flash memory drives that constitute the RAID group A. The FMD number list 240 includes the entry of the number of the flash memory drives 228 that constitute the RAID group A. Each of the entries stores a physical address (e.g., WWN: world wide name) 241 of the flash memory drives that constitute the RAID group A. In this way, each of the drives that belong to the RAID group is capable of recognizing the drives that constitute the RAID group by the physical addresses specific to the flash memory drives even if the physical mounting position of the drives are discontinuously arranged. Also, it is possible to add a new flash memory drive that is exchanged at the time of occurrence of a failure at an arbitrary physical mounting position.

In this embodiment, because the RAID group A is made up of six flash memory drives, "6" is stored in the number of flash memory drives 228. Because the RAID group A is of the 2D1P configuration as described above, it is expressed that the capacity corresponding to three spare drives is included.

The FMD number list 240 stores the physical addresses of the flash memory drives, and stores the physical addresses of FMD#A1 to FMD#A6 in the respective entries 241.

The FMD counter 260 stores the counter information corresponding to the respective flash memory drives. The FMD counter 260 stores the total of defective pages 261, the total of parity areas 263, the total of temporary storage areas 265, the number of times of writing 267, the number of times of erasing occurrences 269, and the remaining number of substitute pages 271, as the counter information of the respective drives.

The total of defective pages 261 stores the number of defective pages included in the flash memory drives 150. The total of parity areas 263 stores the number of segments that store the parities included in the flash memory drives 150.

The number of temporary storage areas 265 stores the number of segments to which the temporary storage areas included in the flash memory drive 150 are allocated. The temporary storage area is an area in which the data or parity is not stored and an area being capable of writing new data without data erasing because data stored in the storage area is already erased. The temporary storage area is an area (spare area) corresponding to the segments of the spare drive included in the RAID group. A specific method of using the temporary storage area will be described later.

The number of times of writing 267 stores the number of times of writing the data according to a request from the host computer 100. The number of times of erasing occurrences 269 stores the number of times of erasing the data. The flash memory manages the running period by recording the number of times of erasing because the number of times of erasing is limited. The number of times of writing 267 and the number of times of erasing occurrences 269 may store, instead of actual values, normalized values.

Also, the storage system 120 controls so as to uniformly write data in each of the segments so as not to concentrate writing on a specific segment. The storage system 120 controls so as to uniformly write the data in each of the segments whereby even if the number of times of writing and the number of times of erasing are not recorded in each of the segments, those information can be replaced with the counter information in each of the flash memory drives 150.

The remaining number of substitute pages 271 is the remaining number of useable substitute pages that are included in the flash memory drive. The controller of the FMD allocates the substitute pages as the substitute areas in the case where the defective pages are detected.

(Procedure of Creating RAID Group)

Figure 3:
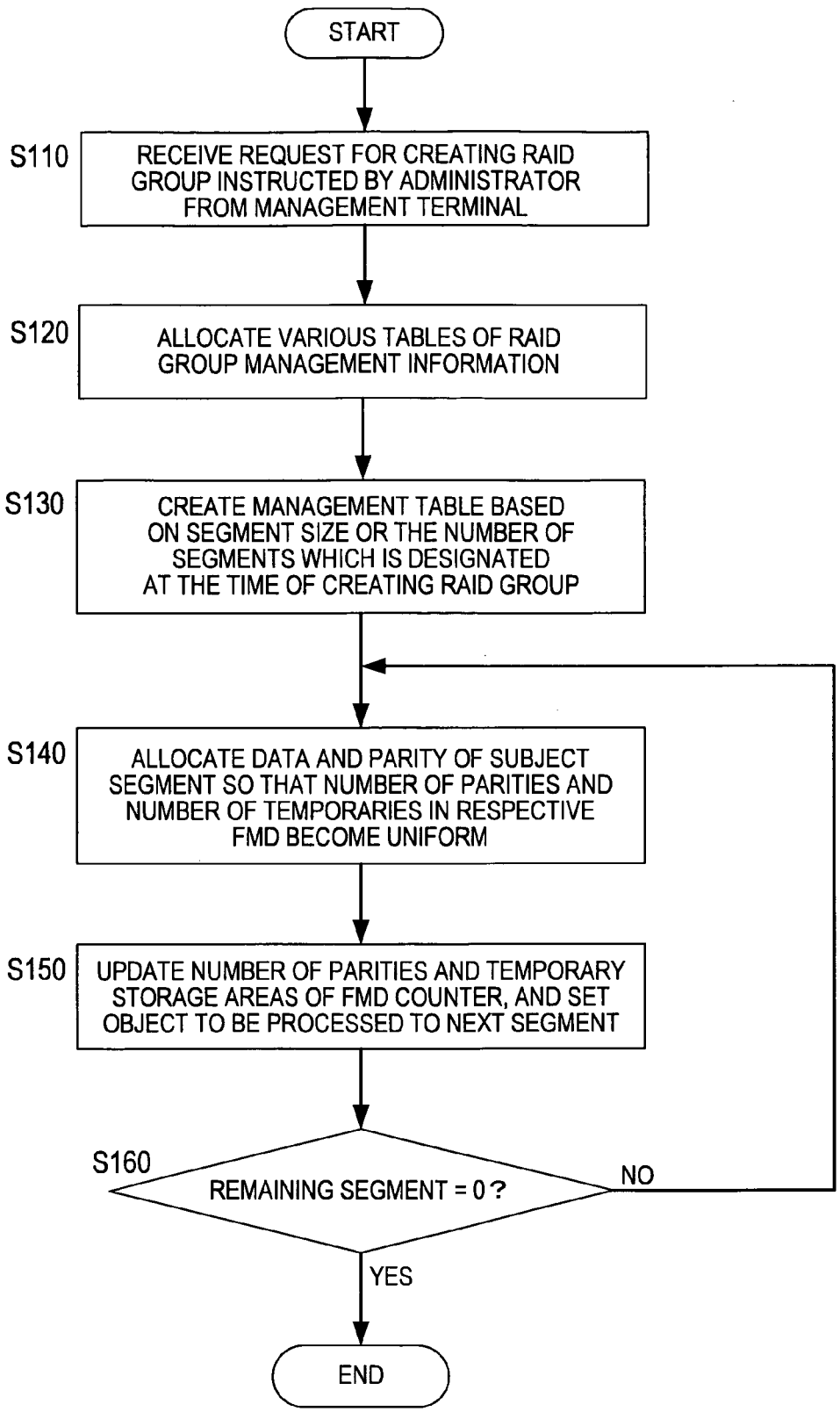
FIG. 3 is a flowchart showing a procedure of creating the RAID group in the storage system according to the embodiment of this invention.

FIG. 3 is a flowchart showing a procedure of creating the RAID group 190 in the storage system according to the embodiment of this invention.

An administrator operates the storage system 120 from a management client 105 when the RAID group 190 is configured in the storage system 120. The administrator first designates the plurality of flash memory drives 150, and then instructs the storage system 120 to create the RAID group 190 (S110). In this situation, the administrator transmits the segment size or the segment number of the segments that divide the flash memory drives, and other necessary instructions in addition to the designation of the flash memory drives. In this embodiment, the administrator instructs the creation of the RAID group with the 2D1P configuration which is configured by six flash memory drives.

Upon receiving the RAID group creation instruction from the administrator, the MPU 140 of the storage system 120 executes the control program 205, to thereby add the entry of the RAID group list 210 and count up the total of RAID group 211.

In addition, the MPU 140 of the storage system 120 stores the configuration information 220 of the added RAID group, the RAID group management table 230, the FMD number list 240, and the FMD counter 260 in the memory 141 (S120). Also, the MPU 140 stores the information that is settable at this time point among the information instructed by the administrator in the respective tables.

Subsequently, the MPU 140 of the storage system 120 divides the storage area of the flash memory drives on the basis of the segment size or the segment number which is instructed at the time of creating the RAID group (S130), and determines the configuration of the RAID group management table 230. In the case where the MPU 140 designates the segment size, the MPU 140 is capable of calculating the number of segments by subtracting the capacity of the flash memory drives from the segment size.

The MPU 140 of the storage system 120 arranges two pieces of data and the parity in the flash memory drive in each of the segments as an initial state of the RAID group 190 (S140). In this situation, the MPU 140 disperses the data storage areas and the parity areas into the segments of the respective flash memory drives in the respective FMDs so that the total of data and parities become uniform. Also, the area to which the data and the parities are not allocated becomes a temporary storage area. In this embodiment, as described above, the data storage area and the parity area are allocated to the spare drive.

The MPU 140 of the storage system 120 sets the total of parity areas 263 of the FMD counter 260 and the total of temporary storage areas 265 (S150).

The MPU 140 of the storage system 120 determines whether the processing of Steps S140 and S150 has been completed, or not, with respect to all of the segments (S160). In the case where unprocessed segments remain (the result of Step 160 is "No"), the MPU 140 continues the processing with respect to the unprocessed segments. In the case where the processing has been completed with respect to all of the segments (the result of S160 is "Yes"), this processing is completed.

The MPU 140 of the storage system 120 configures the RAID groups through the above-mentioned processing, and supplies the RAID group to the host computer 100 as the data storage area. Further, in order that the host computer 100 accesses to the data storage area of the RAID group, the MPU 140 defines the data storage area as the logical unit (LU), and allocates the LU to the host, thereby enabling data to be read and written.

(Correspondence to RAID Group)

Figure 4:
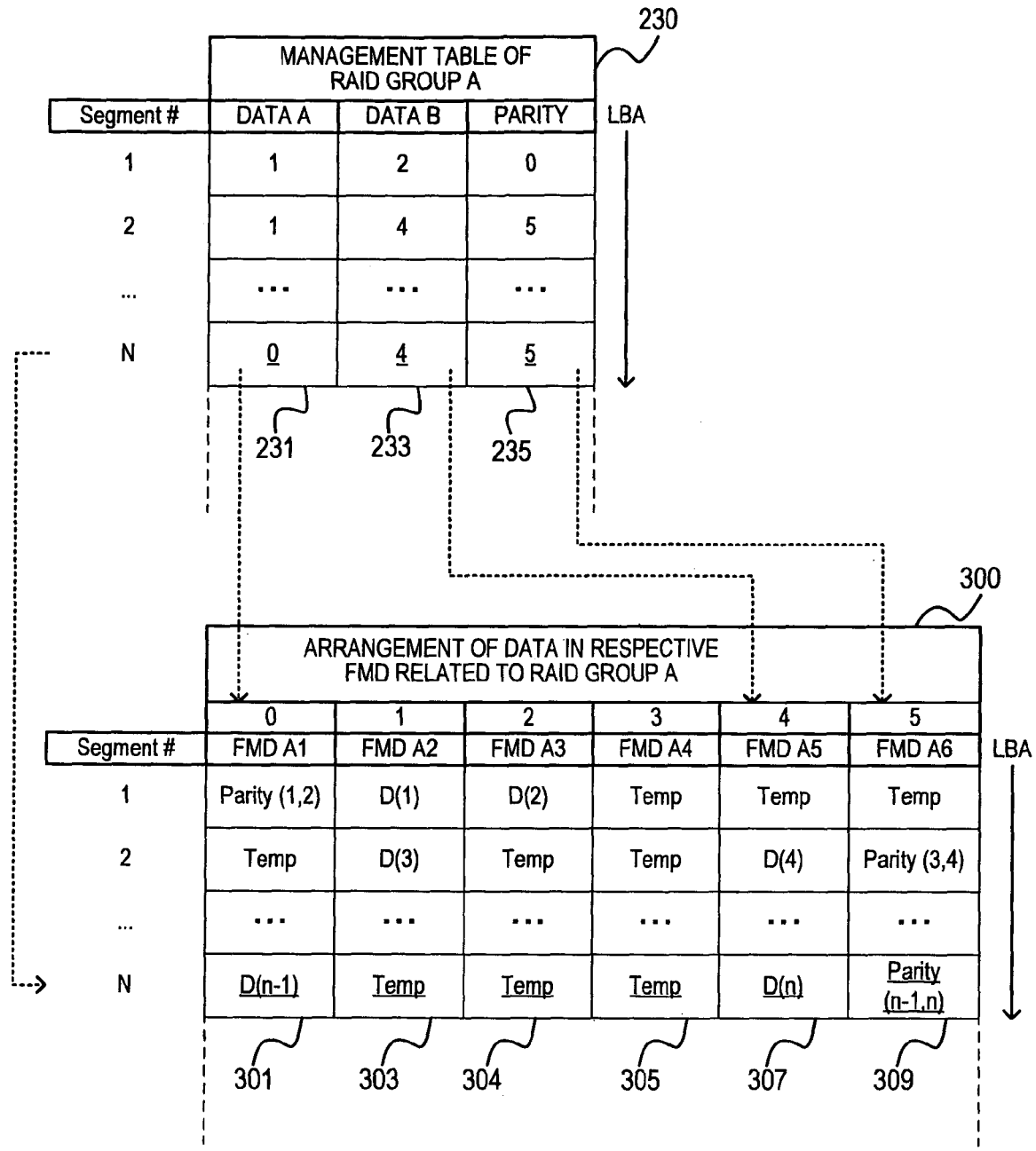
FIG. 4 is a diagram showing a relationship of the data arrangement between the RAID group management table and the RAID group according to the embodiment of this invention.

FIG. 4 is a diagram showing a relationship of the data arrangement between the RAID group management table and the RAID group according to the embodiment of this invention.

An upper portion of FIG. 4 shows an example of the RAID group management table 230. A lower portion of FIG. 4 shows a data arrangement 300 of the respective flash memory drives 150 in the case where the RAID group is configured as shown in the upper portion of FIG. 4. The respective values indicated in the data arrangement 300 represent the corresponding segments and areas. More specifically, the data storage area is represented by "D(n−1)" and "D(n)", the parity area is represented by "Parity (n−1,n)", and the temporary storage area is represented by "Temp".

The RAID group according to this embodiment is of the 2D1P configuration of the RAID 5, which is a configuration in which two data storage areas and one parity area are allocated to the respective segments. In the description of a final entry (segment#N) of the RAID group management table 230, data A is arranged in FMD#0 (231), data B is arranged in FMD#4 (233), and the parity is arranged in FMD#5 (235).

Also, the control program allocates the data A (D(n−1)) to the segment #N (301) of the FMD#A1, and the data B (D(n)) to the segment #N (307) of the FMD#A5. Also, the control program allocates the parities (Parity (n−1, n)) of the data A and the data B to the segment #N (309) of the FMD#A6. The control program allocates the temporary storage area to the segments #N of the remaining FMD#A2, FMD#A3, and FMD#A4.

(Procedure of Writing Data)

Subsequently, a description will be given of a process of reading and writing data with respect to a logical unit (LU) that is allocated to the RAID group by the host computer 100 with reference to FIG. 5 and FIG. 6.

First, a procedure of writing in the LU will be described. As the outline of this processing, in the case where the data to be written is larger than a given size, data is not written in the data storage area of the segment to be written, but data is written in the temporary storage area of the same segment.

Then, the temporary storage area into which the data has been written is changed to the data storage area, and the original data storage area is erased and changed to the temporary storage area.

Figure 5:
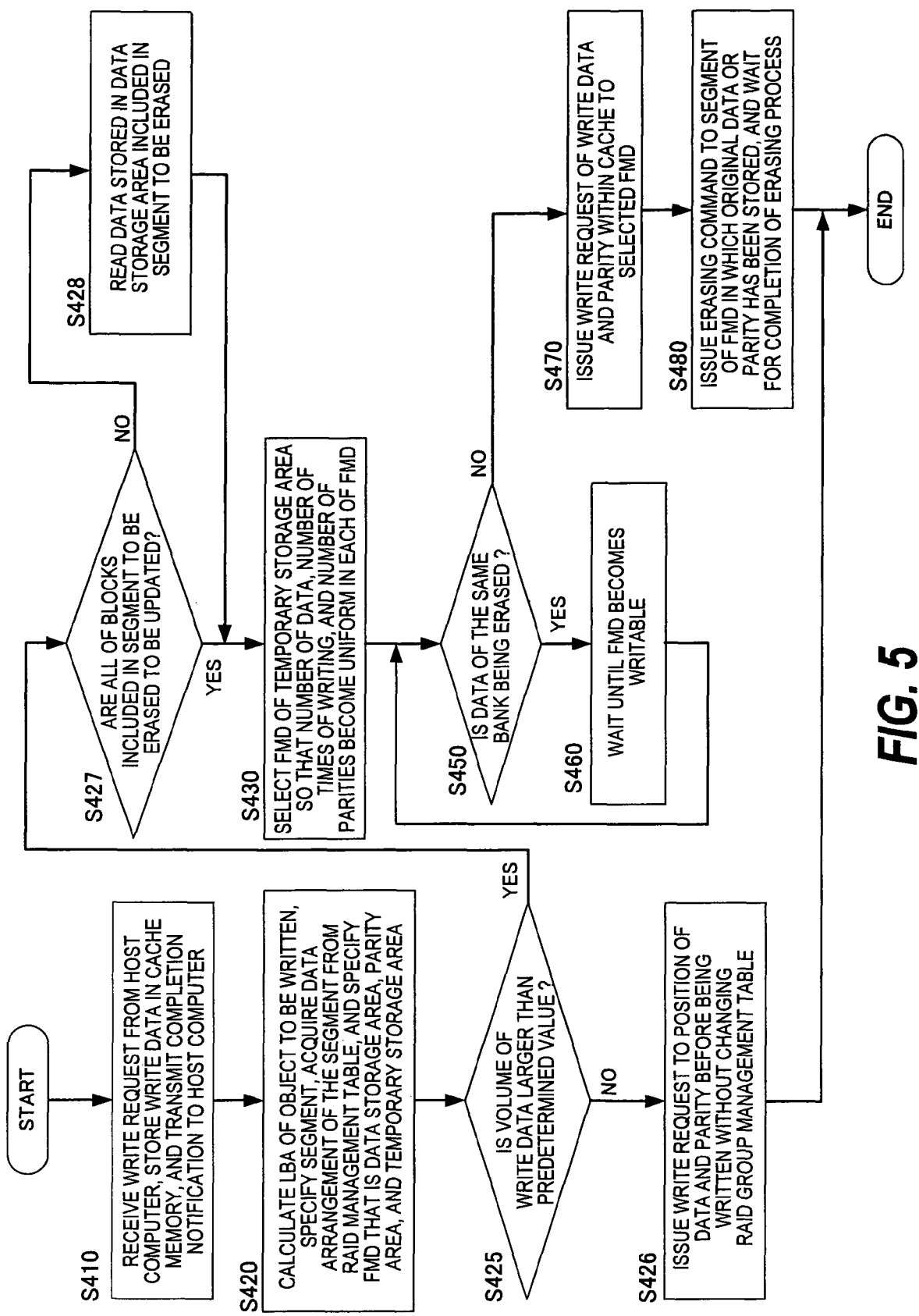
FIG. 5 is a flowchart showing a procedure of the writing process in the storage system according to the embodiment of this invention.

FIG. 5 is a flowchart showing a procedure of the writing process in the storage system according to the embodiment of this invention. Upon receiving the write request from the host computer 100, the MPU 140 of the storage system 120 executes the control program 205 to start this processing.

Upon receiving the write request from the host computer 100, the MPU 140 of the storage system 120 stores the write data in the cache memory of the cache PK 135, and transmits the completion notification to the host computer 100 (S410).

Subsequently, the MPU 140 of the storage system 120 calculates the logical block address to be written. Then, the MPU 140 specifies the segment corresponding to the associated RAID group management table 230, acquires the arrangement information of the data, parity, and temporary storage areas, and specifies the FMD to which the data storage area and the temporary storage area have been allocated (S420).

Figure 6A:
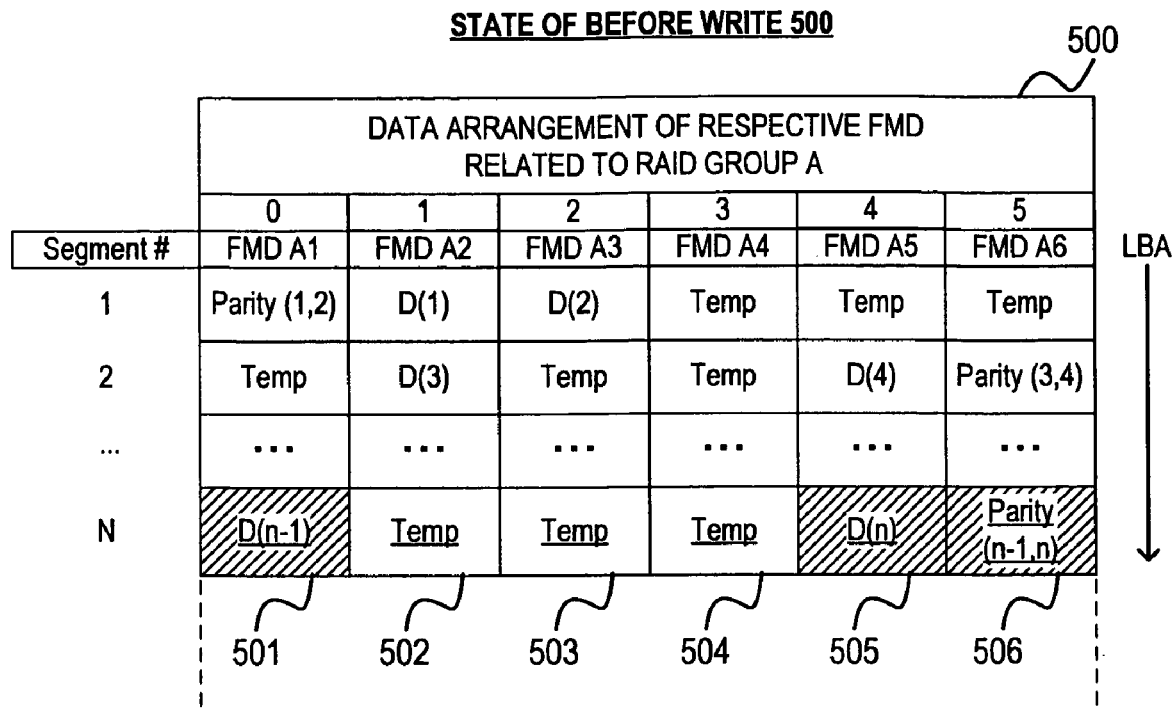
FIG. 6A is a diagram showing a data arrangement before executing the writing process according to the embodiment of this invention.

FIG. 6A is a diagram showing a data arrangement 500 before executing the writing process according to the embodiment of this invention. The data arrangement 500 is in a state before the writing process shown in FIG. 5 is executed. Also, the segment that is specified by the processing of Step S420 of FIG. 5 is the segment #N.

Data storage areas 501 and 505 correspond to FMD#A1 and FMD#A5, respectively, and the parity area 506 corresponds to FMD#A6. Also, the temporary storage areas 502, 503 and 504 correspond to FMD#A2, FMD#A3, and FMD#A4, respectively. The oblique line portions represent the data storage areas 501 and 505 and the parity area 506 which are to be migrated.

Now, a description will be returned to the data writing process shown in FIG. 5.

Subsequently, the MPU 140 of the storage system 120 determines whether the capacity of the write data is larger than a given value, or not (S425). The given value is a value that is determined on the basis of the result of measuring that overwriting directly in the flash memory is more efficient in advance. More specifically, in the case where the number of blocks (512 B) that overwrites the data within the segments (for example, 256 segments in the case where 128 KB, and block size of 512 B) as a result of measurement exceeds, for example, 16 (8 KB), it is preferable to migrate to the temporary storage area. In the case where the number of blocks does not exceed 16, it is preferable to overwrite data on the same flash memory drive. From the above-mentioned evaluation result, the given value is set to 8 KB in this embodiment.

In the case where the capacity of the write data is equal to or lower than the given value (the result in Step S425 is "No"), the MPU 140 of the storage system 120 applies the conventional overwriting operation in which the erasing operation of the storage area and the reclamation operation are conducted by a controller within the flash memory drive, which is more excellent in the write performance. For that reason, the MPU 140 writes the data in the same logical block address of the data storage areas 501 and 505 as in the conventional art (S426). Within the flash memory drive, after the MPU 140 erases the block as the occasion demands, ensures the writable area, the MPU 140 writes the data in an area (the above-mentioned ensured writable area) of the physical address that is different from the logical address out of the flash memory drive, in fact, and updates the correspondence of the physical block address and the logical block address.

Also, in the case where the writing process of Step S426 is repeatedly executed according to a write instruction from the host computer 100, the flash memory controller 157 of the flash memory drive executes the reclamation as in the conventional art. The process of changing the data and parity in Step S426 changes a part of the data storage areas (501 and 505) and the parity area 506 of FIG. 6A, and does not migrate the data storage area and the parity area to another flash memory drive.

On the other hand, in the case where the capacity of the write data is larger than a given value (the result in Step S425 is "Yes"), the MPU 140 of the storage system 120 controls so as to erase the written existing data, and newly write the existing data and the write data in the flash memory drive. However, as described above, a time required to erase the data of the flash memory drive is extremely large as compared with the time required to read and write the data. Under the circumstances, in this embodiment, the write and erase are executed in parallel, to thereby improve the processing performance. A specific process will be described below.

The MPU 140 of the storage system 120 first determines whether all of blocks included in the segment to be erased are updated, or not (S427). In the case where all of the blocks included in the data in the segments to be erased are not updated (the result in Step S427 is "No"), the MPU 140 reads the data that is stored in the data storage area included in the segment to be erased. In this situation, it is preferable to delete the data traffic by selecting only the data that is not overwritten by the data that has been transmitted from the host computer and partially reading the selected data. Then, the MPU 140 updates the existing data that has been read from the flash memory drive to the write data, and creates the data that is stored in the data storage area. In this situation, the MPU 140 also creates the parity corresponding to the data that has been updated. Finally, the MPU 140 arranges the created data and parity in the cache memory (S428). In the case where all of the blocks included in the segment to be erased are updated (the result of Step S427 is "Yes"), because the data that exists in the flash memory drive can be erased as it is, the MPU 140 does not read the data from the flash memory drive, and transits to processing of Step S430.

Figure 6B:
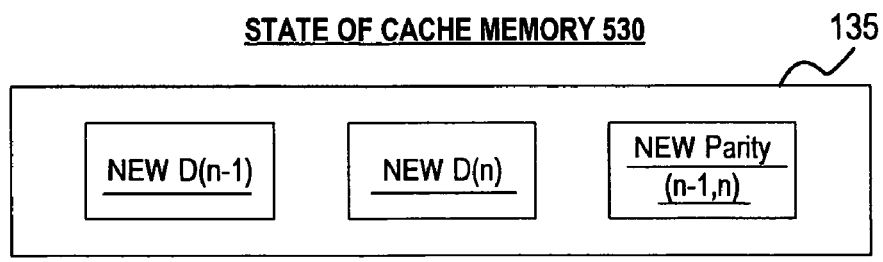
FIG. 6B is a diagram showing a state of the cache memory that temporarily stores the data that has been updated through the writing process according to the embodiment of this invention.

FIG. 6B is a diagram showing a state of the cache memory that temporarily stores the data that has been updated through the writing process according to the embodiment of this invention. The data D(n−1), D(n) and the parity which have been newly creates are stored in the cache memory of the cache PK 135.

A description will be returned to the data writing process shown in FIG. 5.

The MPU 140 of the storage system 120 selects the flash memory drive of the temporary storage area which is specified through the process in Step S420 so that the number of data and the number of writing 267 are uniform in each of the flash memory drives (S430). The number of data is not directly stored in the FMD counter 260, but the number of data coincides with a value obtained by subtracting the total of parity areas 263 and the total of temporary storage areas 265 from the number of segments 227.

Also, the MPU 140 of the storage system 120 selects the flash memory drive of the temporary storage area that is specified through the process in Step S420 so that the total of parity areas 263 becomes uniform in each of the flash memory drives (S430).

The MPU 140 of the storage system 120 determines whether a bank to which the block in which the data of the selected flash memory drive is written belongs is being erased, or not (S450). The bank is a unit resulting from dividing the flash memory by a certain association degree. In this embodiment, for example, in the case where the plurality of flash memories having the capacity of 1 gigabyte are included in the flash memory drive, and the flash memories are divided by the association degree of 128, 64 pages are set as one bank, and when erasing data stored in one page, other 63 pages that belong to the same bank cannot be accessed (be read, be written and be erased).

In the case where another block of the bank to which the block where data is written belongs is being erased (the result in Step S450 is "Yes"), the MPU 140 of the storage system 120 waits for the completion of the erasing process because the data cannot be temporarily written in the subject block until the erasing process is completed (S460). In the case where the data can be written in the block (the result in Step S450 is "No"), the MPU 140 executes the processing of Step S470. The operation may be controlled by the controller within the flash memory drive.

Subsequently, the MPU 140 of the storage system 120 instructs the flash memory drive that has been selected by the processing of Step S430 so as to write the data and parity which have been held in the cache memory in a given segment (S470).

Finally, the MPU 140 of the storage system 120 issues an erasing command to the segment of the flash memory drive into which the original data or parity has been stored after the processing of Step S470 is completed (S480). Upon receiving the completion notification with respect to the erasing command that has been issued in the processing of Step S480, the MPU 140 of the storage system 120 updates the number of times of erasing occurrences 269 of the FMD counter 260 in the subject flash memory drive, and this processing is completed.

As described above, in the case where the data is erased in order to update the data, the MPU 140 of the storage system 120 writes the update data in the temporary storage area and migrates the data storage area, and erases the original data storage area in parallel, thereby enabling an erasing time that induces the bottleneck of the update processing to be hidden.

Also, the MPU 140 of the storage system 120 determines the migrated areas of the data storage area and the parity area on the basis of the number of times of erasing, thereby enabling the number of times of erasing in the flash memory drives that constitute the RAID group to be uniformed.

In addition, the MPU 140 of the storage system 120 determines the migrated areas of the data storage area and the parity area on the basis of the number of data storage areas and the number of parity areas, thereby enabling the configuration in each of the flash memory drives that constitute the RAID group to be uniformed.

Hereinafter, a description will be given of a case where the capacity of the data that is written in the data storage area is larger than a given value (the result in Step S425 is "Yes") with reference to 6C.

Figure 6C:
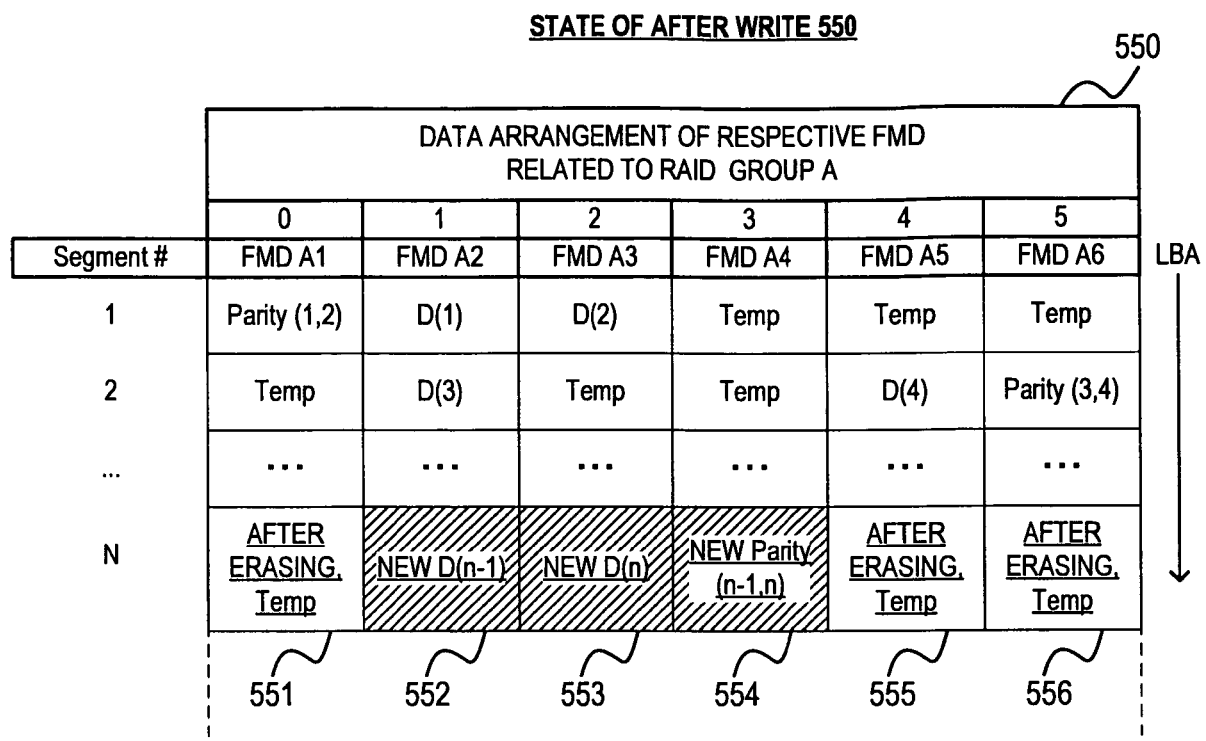
FIG. 6C is a diagram showing a data arrangement after the writing process has been completed according to the embodiment of this invention.

FIG. 6C is a diagram showing a data arrangement 550 after the writing process has been completed according to the embodiment of this invention. The data arrangement 550 shows the result of writing the data of a size that is equal to or larger than a given value in the segment of the segment #N in a state of the data arrangement 500 shown in FIG. 6A.

The MPU 140 of the storage system 120 newly selects the temporary storage areas that are to be the data storage area and the parity area through the processing of Step S430. The MPU 140 of the storage system 120 selects the temporary storage areas 502 and 503 in FIG. 6A as new data storage areas to form new data storage areas 552 and 553. Likewise, the temporary storage area 504 is selected as a new parity area to form a new parity area 554. The oblique line portions are the migrated new data storage areas 552 and 553, and the new parity area 554.

Thereafter, the MPU 140 of the storage system 120 issues the erasing command to the original data storage areas 501 and 505, and the parity area 506 shown in FIG. 6A through the processing of Step S480. Upon the completion of the erasing process, the subject areas are used as the temporary storage areas 551, 555 and 556.

(Procedure of Reading Data)

Subsequently, a procedure of reading the data that has been stored in the LU will be described. This processing is essentially identical with the procedure of reading the data that has been stored in the normal flash memory drive, but different in the procedure in the case where the erasing process is executed in the same bank as the bank that belongs to the block in which the read data has been recorded.

Figure 7:
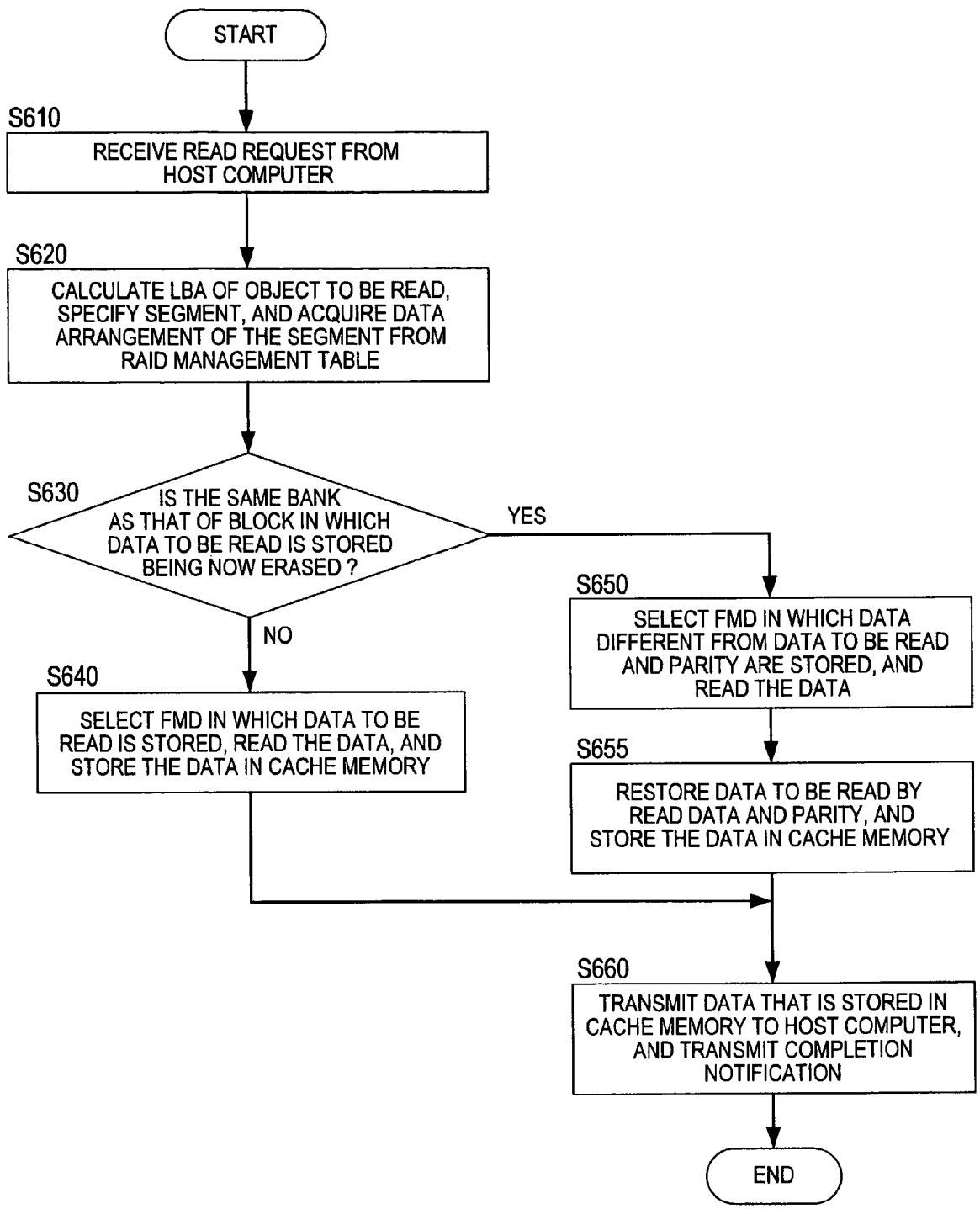
FIG. 7 is a flowchart showing a procedure of reading the data in the storage system according to the embodiment of this invention.

FIG. 7 is a flowchart showing a procedure of reading the data in the storage system according to the embodiment of this invention. Upon receiving the data read request from the host computer 100, the MPU 140 of the storage system 120 executes the control program 205 to start this processing.

The MPU 140 of the storage system 120 first receives the data read request from the host computer 100 (S610).

Then, the MPU 140 of the storage system 120 calculates the logical block address (LBA) in which the data to be read has been stored. Subsequently, the MPU 140 specifies the segment corresponding to the RAID group management table 230, acquires the arrangement information of the data area, parity area, and temporary areas, and specifies the flash memory drive to which the data storage area where data to be read has been stored is allocated (S620).

Subsequently, the MPU 140 of the storage system 120 determines whether the erasing process has been executed in the bank to which the block where data to be read has been stored belongs, or not (S630). Whether the erasing process is executed, or not can be determined by the fact that, as shown in Step S480 of FIG. 5, the erasing command is being issued, and the notification of the erasing command execution completion has not been received.

In the case where the erasing process has not been executed in the bank to which the block where data to be read has been stored belongs (the result in Step S630 is "No"), the MPU 140 of the storage system 120 executes the normal reading process. More specifically, the MPU 140 requests the data read with respect to the flash memory drive in which the data to be read has been stored which is specified by the processing of Step S620. Then, the MPU 140 stores the read data in the cache memory (S640). A data arrangement in the case the processing of Step S640 is executed is shown in FIG. 8A.

Figure 8A:
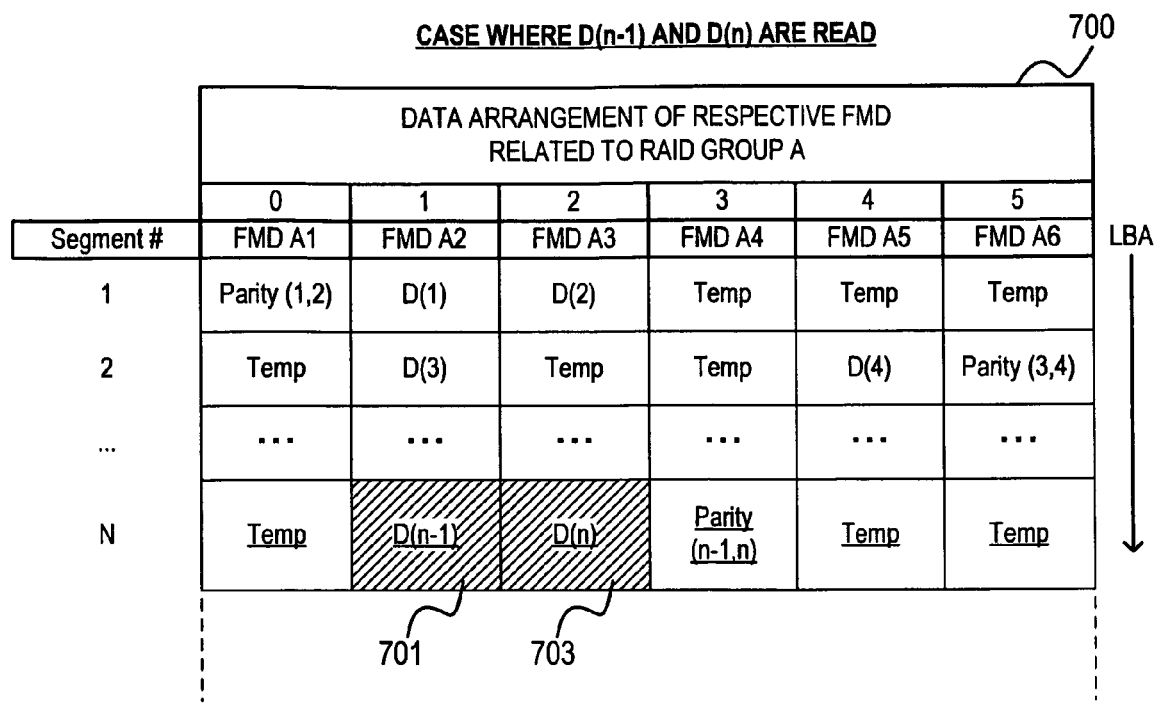
FIG. 8A is a diagram showing a data arrangement 700 in the case where the erasing process is not executed in the bank to which the block where the data to be read has been stored belongs according to the embodiment of this invention.

FIG. 8A is a diagram showing a data arrangement 700 in the case where the erasing process is not executed in the bank to which the block where the data to be read has been stored belongs according to the embodiment of this invention. The segment that has been specified through the processing of Step S620 of FIG. 7 is set as the segment #N, and the data storage areas correspond to the FMD#A2 (702) and FMD#A3 (703).

Now, the description will be returned to the data reading process of FIG. 7.

In the case where the erasing process is executed in the bank to which the block where the data to be read has been stored belongs (the result in Step 630 is "No"), the MPU 140 cannot temporarily read the data that belongs to the same bank as that of the erasing data. Under the circumstances, in this embodiment, the MPU 140 restores the data that cannot be temporarily read, from the data and parity which have been stored in the block that does not belong to the bank in which the erasing process is executed in the same segment of another drive through the XOR operation. As described above, erasing the data requires time. Therefore, the MPU 140 is capable of acquiring the data without waiting for the completion of erasing, thereby enabling the time required to read the data to be reduced.

More specifically, the MPU 140 of the storage system 120 first requires reading of the flash memory drive including the segment in which the parity has been stored and the segment in which the data that is not subjected to erasing process is stored (S650). Then, the MPU 140 subjects the read data and parity to XOR operation, to thereby restore the data to be read and store the data in the cache memory (S655). The above-mentioned processing will be further described with reference to FIG. 8B.

Figure 8B:
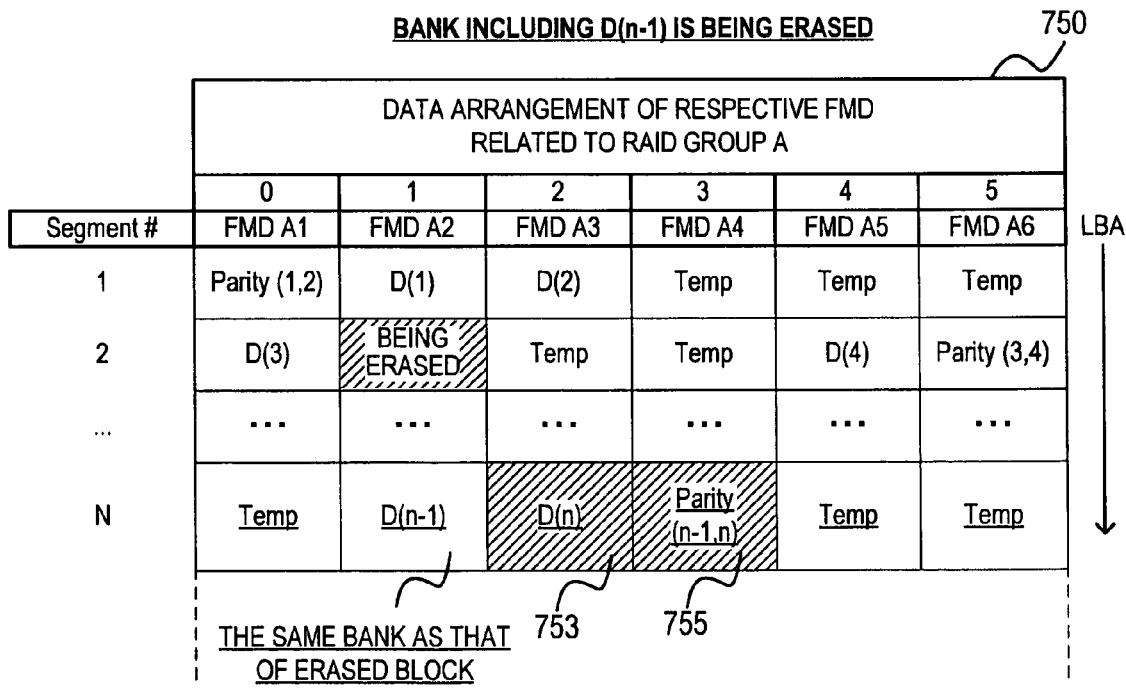
FIG. 8B is a diagram showing a data arrangement 750 in the case where the erasing process is executed in the bank to which the block where the data to be read has been stored belongs according to the embodiment of this invention.

FIG. 8B is a diagram showing a data arrangement 750 in the case where the erasing process is executed in the bank to which the block where the data to be read has been stored belongs according to the embodiment of this invention. The segment that has been specified through the processing of Step S620 of FIG. 7 is set as the segment #N as in the case of FIG. 8A. The data storage areas correspond to the FMD#A2 (751) and the FMD#A3 (753).

In the data arrangement 750, the erasing process is executed by the segment #2 of the FMD#A2. In this case, because the segment #2 and the segment #N belong to the same bank, it is impossible to read the data that has been stored in the segment #N. Under the circumstances, the MPU 140 of the storage system 120 restores the data 751 on the basis of the data 753 and the parity 755 to acquire the read data.

Now, the description will be returned to the process of reading the data of FIG. 7.

The MPU 140 of the storage system 120 finally transmits the read data that has been stored in the cache memory to the host computer 100. Then, the MPU 140 transmits the completion notification (or the abnormality notification) to the host computer 100, and completes this processing (S660).

(Preventive Maintenance and Failure Restoration)

Subsequently, a description will be given of a preventive maintenance for preventing a failure from occurring in the storage system including the flash memory drives according to the embodiment of this invention.

In the case where a defective page occurs, the flash memory drive uses the substitute page that is ensured in advance, thereby enabling the operation to be continued. However, when all of the ensured substitute pages are used, it is impossible to read and write data.

Thus, the storage system holds information such as the total of defective pages and the remaining number of substitute pages in the respective flash memory drives, and notifies the administrator of the exchange of the FMD in the case where, for example, the total of defective pages exceeds a given value.

The storage system according to this embodiment stores the total of defective pages 261 of the respective flash memory drives in the FMD counter 260. In the case where the defective page occurs, the storage system increments the total of defective pages 261 of the flash memory drives. The occurrence of a defective page refers to a case where the erasing operation is not completed within an allowed time, and new data cannot be written. Alternatively, control may be conducted so that the number of defective pages is managed within the flash memory drives, and the MPU 140 periodically inquires the flash memory drives about the number of defective pages.

Also, as described above, because the number of times of erasing is limited, the flash memory drive records the number of times of erasing occurrences 269 in the FMD counter 260, thereby making it possible to inform, when the number of times of erasing occurrences 269 exceeds a given threshold value, the administrator of the fact.

As described above, the storage system having the flash memory drives facilitates the exchange of the flash memory drive before a failure occurs in the flash memory drive, thereby preventing the occurrence of the failure.

In addition, in the case where the flash memory drive has the redundant configuration, the storage system is capable of restoring the data even if a failure occurs. For example, in the case of the RAID5 configuration, even if a failure occurs in one flash memory drive, the storage system is capable of restoring the data by the data and parity which have been stored in the remaining flash memory drives. Accordingly, in the case where a failure occurs in one flash memory drive, the storage system exchanges the flash memory drive, restores the data, and copies the restored data into the exchanged flash memory drive, thereby enabling the data to be restored from the failure at an early stage. Copying of the restored data into the exchanged flash memory drive as described above is called "collection copy".

The collection copy may be executed in the case of exchanging the flash memory drive not only at the time of failure occurrence, but also as the preventive maintenance before the occurrence of the failure. However, restoration of the data from the data and parity which have been stored in the remaining flash memory drives that are operating enables the data to be read, but the processing performance is deteriorated. Accordingly, it is desirable to complete the collection copy in a time as short as possible.

In the embodiment according to this invention, a description will be given of a method of completing the collection copy in a time as short as possible by using the fact that the segment in which the data and the parity have been stored can be migrated.

Figure 9:
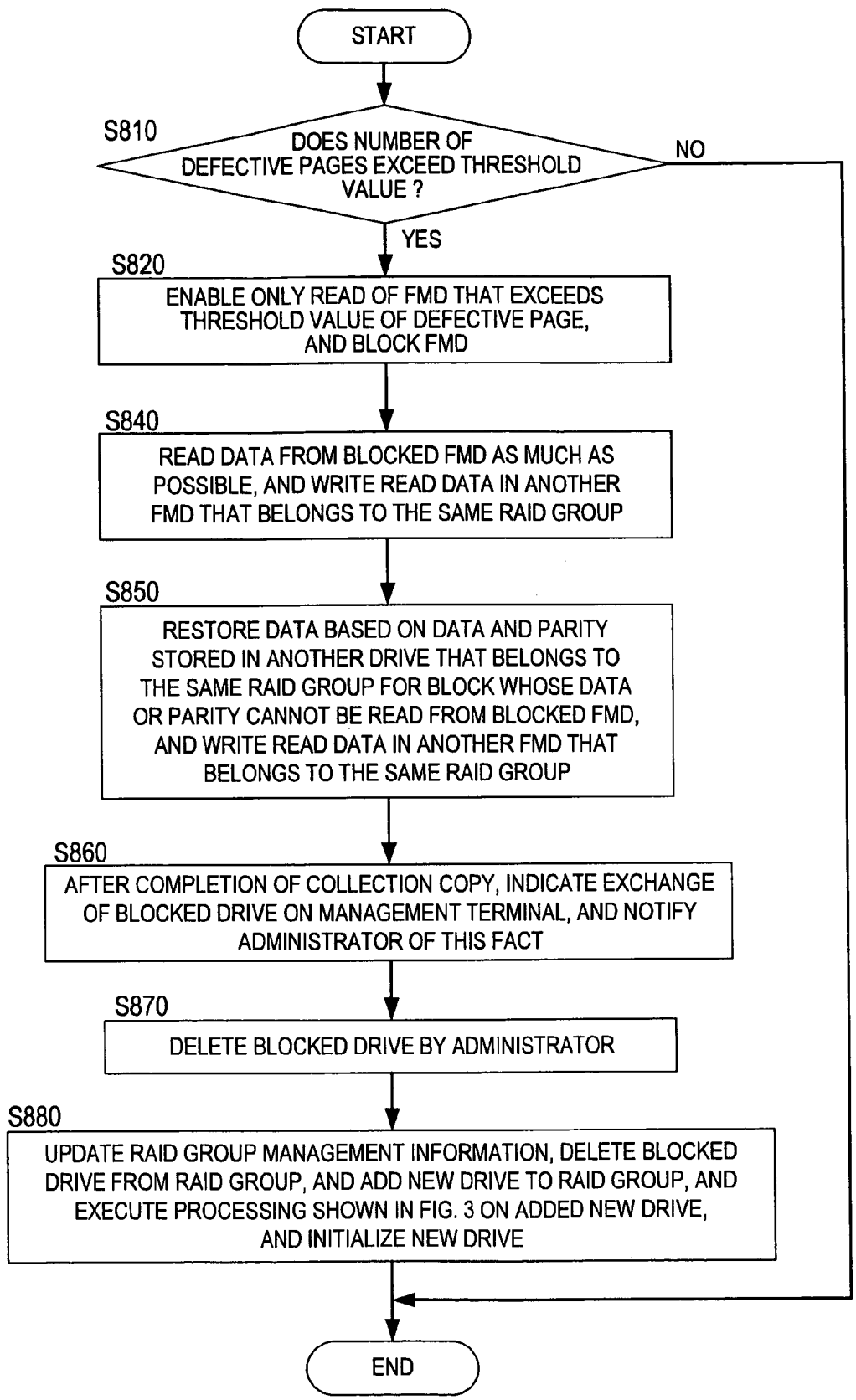
FIG. 9 is a flowchart showing a procedure of the processing that is executed in the case where the defective page of the flash memory drive reaches a given threshold value in the embodiment of this invention.

FIG. 9 is a flowchart showing a procedure of the processing that is executed in the case where the defective page of the flash memory drive 150 reaches a given threshold value in the embodiment of this invention. This processing is periodically executed.

The MPU 140 of the storage system 120 determines whether the total of defective pages 261 of the respective flash memory drives is exceeding the given threshold value, or not (S810). In the case where the total of defective pages 261 is not exceeding the given threshold value in all of the flash memory drives (the result in Step S810 is "No"), this processing is finished.

Upon detecting the flash memory drive in which the total of defective pages 261 is exceeding the given threshold value (the result in Step S810 is "Yes"), the MPU 140 of the storage system 120 blocks the flash memory drive so as to enable only reading.

In the failure of the head or the failure of media in the magnetic disk drive, there is the high possibility that both of reading and writing of the data are made impossible. On the other hand, in the failure of the flash memory drive, new data cannot be written, but data that has been stored in a majority of blocks within the flash memory drive can be read.

Thus, the MPU 140 of the storage system 120 reads the data from the blocked flash memory drive as much as possible, and writes the data that has been read to the temporary storage area which can be written by another flash memory drive that constitutes the RAID group (S840).

FIG. 10A is a diagram showing a data arrangement 900 at the time when the total of defective pages has exceeded the threshold value before the collection copy is executed according to the embodiment of this invention. In the data arrangement 900, the FMD#A4 is determined as a spare drive through the processing of Step S810. The spare drive refers to a flash memory drive in which the total of defective pages has exceeded a given threshold value.

FIG. 10B is a diagram showing a data arrangement 950 after the data of the spare drive has been copied to a segment corresponding to another flash memory drive according to the embodiment of this invention. In the data arrangement 950, the parity that has been stored in the segment #N(951) of the FMD#A4 is copied to the segment #N (953) of the FMD#A5.

Now, the description returns to FIG. 9. The MPU 140 of the storage system 120 subjects the data that could not be read through the processing of Step S840 to XOR operation based on the data and parity stored in another drive, to thereby restore the data or the parity (S850).

The MPU 140 of the storage system 120 copies the data that is stored in the blocked drive to another normal flash memory drive through the processing of Steps S840 and S850. Upon the completion of the processing of Steps S840 and S850, the MPU 140 displays the exchange of the blocked drive on the management client 105 to prompt the administrator of the exchange of the blocked flash memory drive, and completes this processing (S860).

Through the above-mentioned processing, the flash memory drive that has been newly added to the storage system is capable of continuing the operation without copying the data that has been stored in the blocked flash memory drive.

On the other hand, because the newly added flash memory drive initially does not have any data stored therein, the flash memory drives that constitute the RAID group are unbalanced. However, because the number of data storage areas, the number of times of writing 267, and the total of parities 265 are remarkably reduced as compared with other flash memory drives, the data storage area or the parity area is created preferentially according to the writing procedure described with reference to FIG. 5. Accordingly, with the elapse of time, the number of data storage areas and the number of times of writing 267 are made uniform among the flash memory drives that constitute the RAID group.

Also, in the procedure shown in FIG. 9, when the defective drive is detected, notification is issued to the administrator immediately after the data is evacuated to the normal flash memory drive. In this embodiment, six flash memory drives are of the 2D1P configuration, and three temporary storage areas are provided in each of the segments. Thus, even when one defective drive is caused, because two temporary storage areas remain, it is possible to continue the operation. As a result, the normal operation can be continued until a plurality of defective drives according to the configuration of the RAID group are caused.

Figure 11:
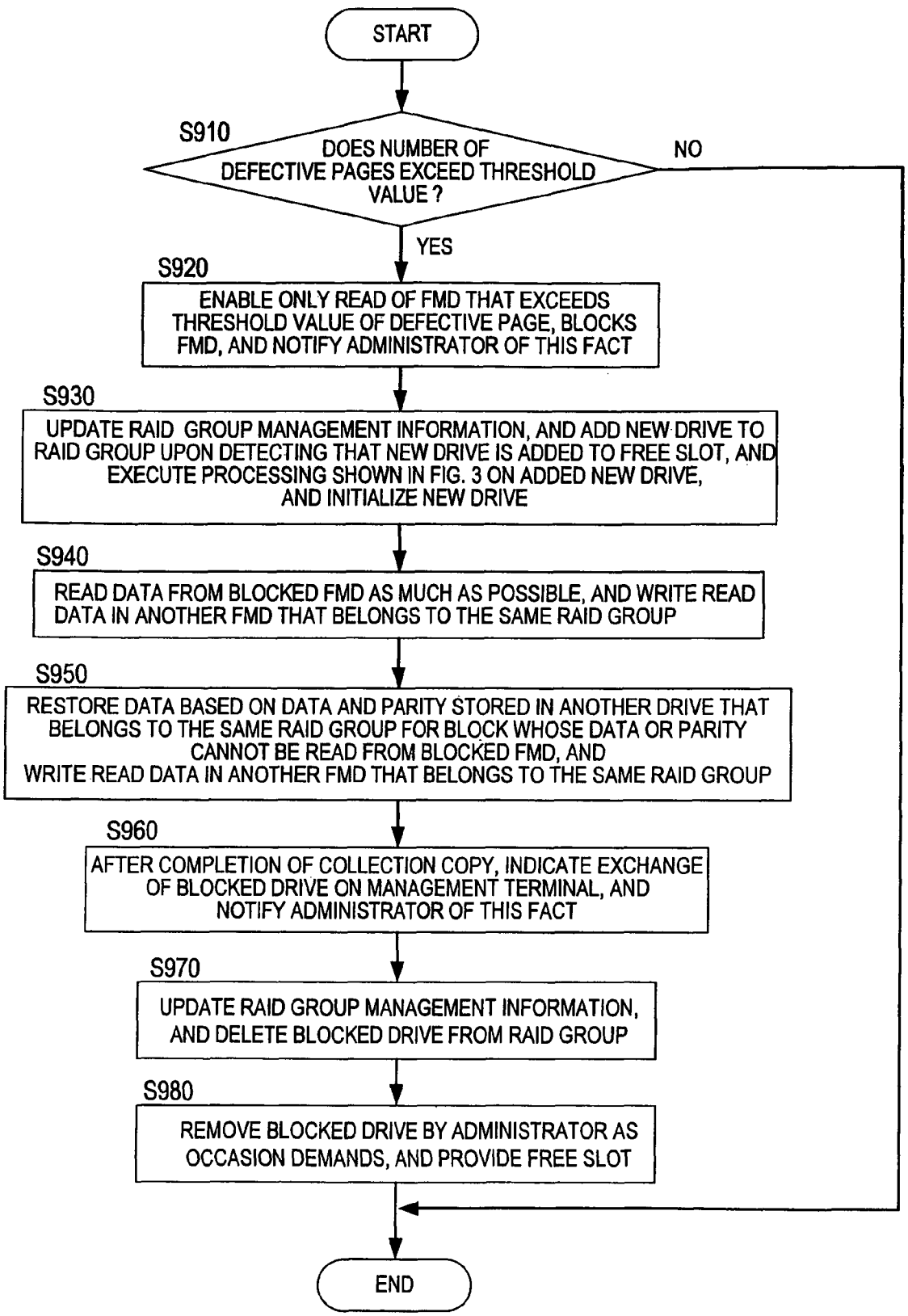
FIG. 11 is a flowchart showing a procedure of the processing that is executed in the case where the number of defective pages of the flash memory drives reaches the threshold value in the embodiment of this invention.

FIG. 11 is a flowchart showing a procedure of the processing that is executed in the case where the number of defective pages of the flash memory drives 150 reaches the threshold value in the embodiment of this invention. This processing is a modification of the procedure of the processing shown in FIG. 9. Description of the common processing will be omitted and differences will be described.

The processing of Step S810 of FIG. 9 and the processing of Step S910 are identical with each other. Also, in the case where the number of defective pages has exceeded the threshold value (the result in Step S910 is "Yes"), the MPU 140 of the storage system 120 blocks the corresponding flash memory drive so as to enable only reading, and notifies the administrator of this fact (S920). Then, the MPU 140 prompts the administrator to add a new flash memory drive to a free slot.

Upon addition of the new flash memory drive to the free slot, the MPU 140 of the storage system 120 updates the RAID group management information 200 and executes the processing shown in FIG. 3 on the added flash memory drive to initialize the flash memory drive (S930).

In addition, the MPU 140 of the storage system 120 copies the data of the block drive to the newly added flash memory drive (collection copy). As a result, it is possible to restore the data by copying the readable data from the blocked drive to the newly added normal drive. For that reason, it is unnecessary to issue the input/output request which is attributable to the collection copy to other flash memory drives that constitute the RAID group except for the block that cannot be read due to the defective page. Therefore, the performance influence on other flash memory drives that are operating is suppressed.

Upon the completion of the collection copy, the MPU 140 of the storage system 120 displays the exchange instruction of the blocked drive on the management client 105, and notifies the administrator of the exchange of the drive (S960). Further, the MPU 140 of the storage system 120 updates the RAID group management information 200, and excludes the blocked drive from the RAID group (S970). With the above-mentioned operation, the MPU 140 of the storage system 120 can start the operation of the respective flash memory drives in a uniformed state. Also, the MPU 140 is capable of preventing the host computer 100 from accessing the defective drive. After that, the administrator removes the blocked drive as the occasion demands to provide a free slot (S980).

When the data can be read from the blocked flash memory drive even during the execution of the collection copy, the data is processed as it is. On the other hand, even in the case where the data cannot be read, the data and the parity are subjected to the XOR operation to restore the data as the read data, thereby enabling continuation of the operation.

(Case where the Number of Temporary Storage Areas is Small)

The storage system 120 according to this embodiment has the temporary storage area in the number same as the total number of data storage areas and parity areas. However, even in the case where the number of temporary storage areas is smaller than the total number of data storage areas and parity areas, this invention can be applied.

In the flash memory drives according to this embodiment, the storage area is sectioned by a segment unit. For that reason, the capacity of the data that has been stored in the respective segments does not become larger than the capacity that can be temporarily held in the cache memory. Therefore, it is only necessary to hold the write data in the cache memory and wait until the area to be newly written is ensured.

Here, a description will be given of a case where five flash memory drives are mounted to the storage system with the RAID5 configuration of 2D1P according to this embodiment. This configuration includes two spare drives and two temporary storage areas.

When the MPU 140 of the storage system 120 receives the write request from the host computer 100, the areas to be migrated are two data storage areas and one parity area. At this time, the MPU 140 of the storage system 120 first migrates the two data storage areas to two temporary storage areas. At this time, the parity that is written in the parity area is held by the cache memory, and the MPU 140 waits for the completion of the erasing of the migrated data storage areas. Upon the completion of the erasing, the MPU 140 writes the parity according to the above-mentioned procedure.

Because the parity is not used in the case of reading the data, the MPU 140 of the storage system 120 writes in the data storage area ahead, thereby enabling the data to be smoothly read. Also, even in the case of the configuration having one spare drive, because the write load to the respective flash memory drives is uniformed, it is possible to elongate the lifetime of the flash memory drives.

(Redundant Configuration Other Than RAID5)

The RAID group of the storage system 120 according to this embodiment is of the RAID5 configuration, but this invention can be applied to other configurations. For example, this invention can be applied to the RAID6 configuration having two parities, likewise.

Also, in the case of RAID1 configuration (mirroring) and RAID01 (use of both striping and mirroring), there is provided a configuration having a mirror area that stores a data storage area and a copy of the data storage area, and a temporary storage area. More specifically, when the data of a size that is larger than a given size is written in the data storage area, the MPU 140 creates the new write data suited for the stored data, and writes the data in the selected temporary storage area. In addition, the MPU 140 only needs to write the new write data in the newly selected mirror area.

EFFECTS OF THIS EMBODIMENT

According to the embodiment of this invention, by migrating the data storage area and the parity area, instead of writing data after erasing is conducted for overwriting update, erasing time is hidden by migrating the data to the temporary storage area, thereby improving the throughput. Also, because the areas in which the data and the parities are written are migrated, it is possible to make the number of times of writing in the respective flash memory drives uniform, including writing of the parity that is always updated at the time of the write request from the host computer 100.

Also, according to the embodiment of this invention, the bottleneck of the performance can be solved by making the segments identical with each other and writing the parity in the temporary storage area of another drive when the parity is updated.

Further, according to the embodiment of this invention, the data is copied to the temporary storage area from the drive blocked as a read-only drive because of the preventive maintenance. As a result, it is possible to remarkably reduce the time required for collection copy. Also, it is possible to remarkably reduce the number of input/output processing due to the collection copy as compared with the conventional art in the drives except the blocked drive and the newly added drive among the plurality of drives that constitute the RAID group. Therefore, it is possible to prevent the processing performance from being remarkably deteriorated during the execution of the collection copy.

While the present invention has been described in detail and pictorially in the accompanying drawings, the present invention is not limited to such detail but covers various obvious modifications and equivalent arrangements, which fall within the purview of the appended claims.

What is claimed is:

1. A storage system, which is coupled to a host computer through a network and stores data that is read/written by the host computer, comprising:

an interface that is coupled to the network;

a processor that is coupled to the interface;

a memory that is coupled to the processor;

a cache memory in which the read/written data is temporarily stored; and a storage device in which the read/written data is stored, wherein the storage device comprises a plurality of memory drives that are formed of non-volatile memory, and form a group of the memory drives whose number is larger than the number of memory drives necessary to provide the memory capacity which is identified by the host computer, wherein each of the memory drives included in the group has a storage area divided in predetermined capacity, wherein the divided storage areas are managed in each of segments that includes at least one of the divided storage areas included in the respective memory drives included in the group, wherein the processor allocates, to the respective divided storage areas, at least one data storage area in which the read and written data is stored and at least one temporary storage area which is a free area are included in the segment, wherein in the case where the processor receives a data write request from the host computer through the interface, the processor extracts the data storage area in which the write data is written, and specifies the segment including the extracted data storage area, and wherein in the case where size of the write data is larger than a value that is determined on the basis of size of the data that is stored in the extracted data storage area, the processor reads the data stored in the extracted data storage area, updates the read data according to the write request, stores the updated data in the cache memory, selects first temporary storage area included in the specified segment, writes the data stored in the cache memory in the selected first temporary storage area, sets the selected first temporary storage area as a new data storage area, erases the extracted data storage area, and sets the extracted data storage area as a new temporary storage area, wherein the processor:

allocates, to the segment, at least one redundant data storage area in which redundant data of the data stored in the data storage area;

extracts the redundant data storage area in which the redundant data of the data stored in the extracted data storage area is stored, in the case where the processor receives data requested to write from the host computer through the interface;

updates the redundant data on the basis of the received data write request; and stores the updated redundant data in the cache memory.

2. The storage system according to claim 1, wherein the processor:

selects a second temporary storage area, other than the first temporary storage area, included in the specified segment;

writes the redundant data stored in the cache memory in the selected second temporary storage area;

sets the second temporary storage area in which the redundant data is written as a new redundant data storage area;

erases the data stored in the extracted redundant data storage area; and
set the redundant data storage area in which the data is erased, as a new temporary storage area.

3. The storage system according to claim 1, wherein the processor: records at least one of the number of times of writing data and the number of times of erasing data in the divided storage areas as counter information in each of the memory drives; and
selects a temporary storage area as a new data storage area on the basis of the counter information upon newly creating a data storage area.

4. The storage system according to claim 2, wherein the total of number of the data storage areas included in the segment and number of the redundant data storage areas included in the segment is equal to the number of temporary storage areas.

5. The storage system according to claim 2, wherein the redundant data storage area stores a copy of the data stored in the data storage area included in the segment in which the redundant data storage area is included as the redundant data.

6. The storage system according to claim 2, wherein the redundant data storage area stores the parity information that is created on the basis of the data stored in a plurality of data storage areas included in the segment in which the redundant data storage area is included as the redundant data.

7. The storage system according to claim 6, wherein the processor selects the temporary storage area that is included in the memory drive in which the number of allocated redundant data storage areas is smaller when newly allocating the redundant data storage area.

8. The storage system according to claim 2, wherein the processor:
records the number of defective pages included in the memory drives included in the group;
blocks the memory drive to prohibit data writing into the blocked memory drive, in the case where the number of defective pages is larger than a predetermined threshold value;
selects a migration destination temporary storage area in each of the segments in order to migrate the data stored in the block memory drive;
reads the readable data from the blocked memory drive;
writes the read data in the selected migration destination temporary storage area; and
restores the data that can not be read to write the restored data in the selected migration destination temporary storage area, in the case where data can not be read from the blocked memory drive.

9. The storage system according to claim 2, wherein the processor:
records the number of defective pages included in the memory drives included in the group;
blocks the memory drive to prohibit data writing into the blocked memory drive, in the case where the number of defective pages is larger than a predetermined threshold value;
requests addition of a new memory drive,
adds the added memory drive to the group when the new memory drive is added;
divides the storage area of the added memory drive in every predetermined capacity;
adds the divided storage areas to the segments as the temporary storage areas;
reads the readable data from the blocked memory drive;
writes the read data in the added temporary storage area; and
restores the data that can not be read to write the restored data in the added temporary storage area, in the case where the data can not be read from the blocked memory drive.

10. The storage system according to claim 2, wherein in the case where the processor receives a data read request from the host computer and the requested data can not be temporarily read from the data storage area in which the requested data is stored, the processor restores the requested data based on the data stored in the redundant data storage area and the data that is stored in another data storage area included in the segment in which the data storage area in which the requested data is stored is included, and provides the host computer.

11. A data arrangement control method for a storage system that is coupled to a host computer through a network and stores data that is read/written by the host computer,
the storage system having: an interface that is coupled to the network; a processor that is coupled to the interface; a memory that is coupled to the processor; a cache memory in which the read/written data is temporarily stored; and a storage device in which the read/written data is stored,
the storage device having a plurality of memory drives that are formed of non-volatile memory, and form a group of the memory drives whose number is larger than the number of memory drives necessary to provide the memory capacity which is identified by the host computer,
each of the memory drives included in the group having a storage area divided in predetermined capacity,
the divided storage areas being managed in each of segments that includes at least one of the divided storage areas included in the respective memory drives included in the group,
the data arrangement control method comprising:
allocating, by the processor, to the respective divided storage areas, at least one data storage area in which the read and written data is stored and at least one temporary storage area which is a free area are included in the segment;
extracting, by the processor, in the case where the processor receives a data write request from the host computer through the interface, the data storage area in which the write data is written, and specifying the segment including the extracted data storage area; and
reading, by the processor, in the case where size of the write data is larger than a value that is determined on the basis of size of the data that is stored in the extracted data storage area, the data stored in the extracted data storage area, updating the read data according to the write request, storing the updated data in the cache memory, selecting first temporary storage area included in the specified segment, writing the data stored in the cache memory in the selected first temporary storage area, setting the selected first temporary storage area as a new data storage area, erasing the extracted data storage area, and setting the extracted data storage area as a new temporary storage area;
allocating, by the processor, to the segment, at least one redundant data storage area in which redundant data of the data stored in the data storage area;
extracting, by the processor, in the case where the processor receives data requested to write from the host computer through the interface, the redundant data storage area in which the redundant data of the data stored in the extracted data storage area is stored;

updating, by the processor, the redundant data on the basis of the received data write request; and
storing, by the processor, the updated redundant data in the cache memory.

12. The data arrangement control method according to claim 11, further comprising the steps of:
selecting, by the processor, a second temporary storage area, other than the first temporary storage area, included in the specified segment;
writing, by the processor, the redundant data stored in the cache memory in the selected another temporary storage area;
setting, by the processor, the second temporary storage area in which the redundant data is written as a new redundant data storage area; and
erasing, by the processor, the data stored in the extracted redundant data storage area; and
setting, by the processor, the redundant storage area in which the data is erased, as a new temporary storage area.

13. The data arrangement control method according to claim 11, further comprising the steps of:
recording, by the processor, at least one of the number of times of writing data and the number of times of erasing data in the divided storage areas as counter information in each of the memory drives; and
selecting, by the processor, when the processor newly creates a data storage area, a temporary storage area as a new data storage area on the basis of the counter information.

14. The data arrangement control method according to claim 11, wherein the total of number of the data storage areas included in the segment and number of the redundant data storage areas included in the segment is equal to the number of temporary storage areas.

15. The data arrangement control method according to claim 12, wherein the redundant data storage area stores a copy of the data stored in the data storage area included in the segment in which the redundant data storage area is included as the redundant data.

16. The data arrangement control method according to claim 12, wherein the redundant data storage area stores the parity information that is created on the basis of the data stored in a plurality of data storage areas included in the segment in which the redundant data storage area belongs as the redundant data.

17. The data arrangement control method according to claim 16, wherein the processor selects the temporary storage area that is included in the memory drive in which the number of allocated redundant data storage areas is smaller when newly allocating the redundant data storage area.

18. The data arrangement control method according to claim 12, further comprising the steps of:

recording, by the processor, the number of defective pages included in the memory drives included in the group;
blocking, by the processor, in the case where the number of defective pages is larger than a predetermined threshold value, the memory drive to prohibit data writing into the blocked memory drive;
selecting, by the processor, in order to migrate the data stored in the block memory drive, a migration destination temporary storage area in each of the segments;
reading, by the processor, the readable data from the blocked memory drive;
writing, by the processor, the read data in the selected migration destination temporary storage area; and
restoring, by the processor, in the case where data can not be read from the blocked memory drive, the data that can not be read to write the restored data in the selected migration destination temporary storage area.

19. The data arrangement control method according to claim 12, further comprising the steps of:
recording, by the processor, the number of defective pages included in the memory drives included in the group;
blocking, by the processor, in the case where the number of defective pages is larger than a predetermined threshold value, the memory drive to prohibit data writing into the blocked memory drive;
requesting, by the processor, addition of a new memory drive;
adding, by the processor, when the new memory drive is added, the added memory drive to the group;
dividing, by the processor, the storage area of the added memory drive in every predetermined capacity;
adding the divided storage areas to the segments as the temporary storage areas;
reading, by the processor, the readable data from the blocked memory drive;
writing the read data in the added temporary storage area; and
restoring, by the processor, in the case where the data can not be read from the blocked memory drive, the data that can not be read to write the restored data in the added temporary storage area.

20. The data arrangement control method according to claim 12, further comprising the step of, restoring, by the processor, in the case where the processor receives a data read request from the host computer and the requested data can not be temporarily read from the data storage area in which the requested data is stored, the requested data based on the data stored in the redundant data storage area and the data that is stored in another data storage area included in the segment in which the data storage area in which the requested data is stored is included, and providing the host computer.

* * * * *